US012566517B1

(12) United States Patent
Ling et al.

(10) Patent No.: US 12,566,517 B1
(45) Date of Patent: Mar. 3, 2026

(54) METHODS AND SYSTEMS FOR DETERMINING ORIENTATION INFORMATION OF PASSIVE STYLUSES

(71) Applicant: PARADE TECHNOLOGIES, LTD, San Jose, CA (US)

(72) Inventors: Yi Ling, Redwood City, CA (US); Roel Coppoolse, San Jose, CA (US); Pete Vavaroutsos, Scotts Valley, CA (US)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 0 days.

(21) Appl. No.: 19/037,730

(22) Filed: Jan. 27, 2025

(51) Int. Cl.
*G06F 3/041* (2006.01)
*G06F 3/0354* (2013.01)
*G06F 3/044* (2006.01)

(52) U.S. Cl.
CPC ...... *G06F 3/04166* (2019.05); *G06F 3/03545* (2013.01); *G06F 3/0446* (2019.05)

(58) Field of Classification Search
CPC . G06F 3/03545; G06F 3/04166; G06F 3/0446
See application file for complete search history.

(56) References Cited

U.S. PATENT DOCUMENTS

| | | | | |
|---|---|---|---|---|
| 11,269,455 | B1 * | 3/2022 | Derichs | G06F 3/0412 |
| 11,269,456 | B1 * | 3/2022 | Eilers | G06F 3/04186 |
| 11,397,492 | B2 * | 7/2022 | Derichs | G06F 3/04186 |
| 11,494,032 | B2 * | 11/2022 | Seger, Jr. | G06F 3/0412 |
| 11,720,207 | B2 * | 8/2023 | Seger, Jr. | G06F 3/0446 |
| | | | | 324/687 |
| 12,079,429 | B2 * | 9/2024 | Seger, Jr. | G06F 3/04182 |
| 2022/0137782 | A1 * | 5/2022 | Seger, Jr. | G06F 3/04182 |
| | | | | 345/156 |
| 2022/0147219 | A1 * | 5/2022 | Derichs | G02F 1/13338 |
| 2023/0028217 | A1 * | 1/2023 | Seger, Jr. | G02F 1/13338 |
| 2023/0289015 | A1 * | 9/2023 | Seger, Jr. | G02F 1/13338 |
| 2024/0411406 | A1 * | 12/2024 | Seger, Jr. | G02F 1/13338 |

FOREIGN PATENT DOCUMENTS

WO WO-2025005161 A1 * 1/2025 ............. G06F 3/044

OTHER PUBLICATIONS

Machine translation of WO-2025005161-A1. (Year: 2025).*

* cited by examiner

*Primary Examiner* — Michael Pervan
(74) *Attorney, Agent, or Firm* — Morgan, Lewis & Bockius LLP

(57) ABSTRACT

An electronic device includes a capacitive sense array made of a plurality of sense electrodes. A subset of sense electrodes of the capacitive sense array is scanned to obtain a plurality of capacitive sense signals, and a touch map is generated from at least a subset of the capacitive sense array based on the plurality of capacitive sense signals. The electronic device determines that the touch map corresponds to a passive stylus. In accordance with a determination that the touch map corresponds to the passive stylus, the electronic device determines a stylus position and one or more orientation parameters of the passive stylus with respect to a surface of the capacitive sense array. In some embodiments, a stylus parameter determination model is applied to process the touch map and determine at least the one or more orientation parameters of the passive stylus.

20 Claims, 12 Drawing Sheets

*800*

*850*

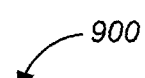

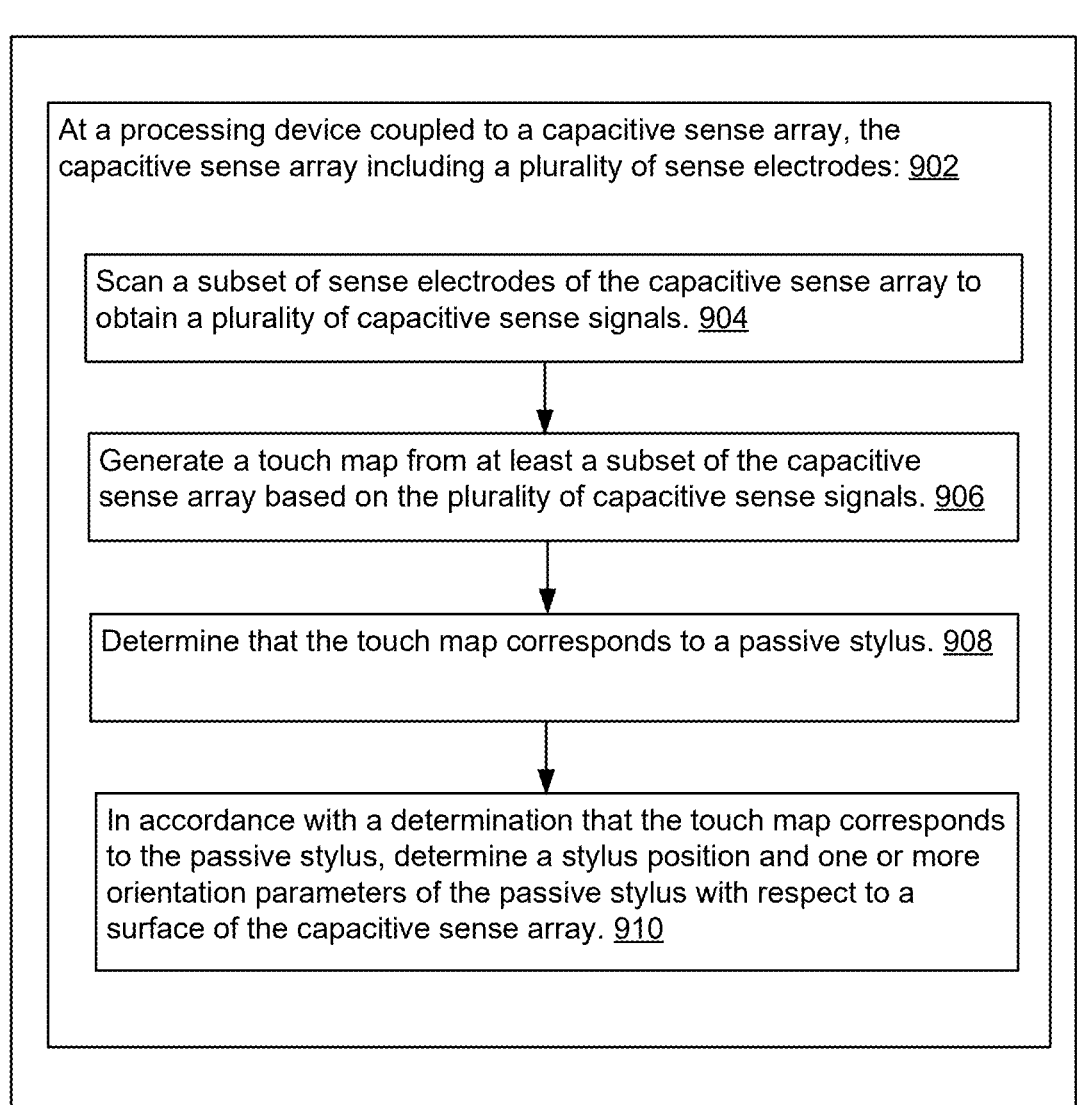

At a processing device coupled to a capacitive sense array, the capacitive sense array including a plurality of sense electrodes: 902

Scan a subset of sense electrodes of the capacitive sense array to obtain a plurality of capacitive sense signals. 904

Generate a touch map from at least a subset of the capacitive sense array based on the plurality of capacitive sense signals. 906

Determine that the touch map corresponds to a passive stylus. 908

In accordance with a determination that the touch map corresponds to the passive stylus, determine a stylus position and one or more orientation parameters of the passive stylus with respect to a surface of the capacitive sense array. 910

Figure 9

METHODS AND SYSTEMS FOR DETERMINING ORIENTATION INFORMATION OF PASSIVE STYLUSES

TECHNICAL FIELD

The disclosed embodiments relate generally to electronic circuits, including, but not limited to, methods, systems, and devices for obtaining signals from a touch detection device and determining orientation information of a passive stylus (e.g., a touch position, a tilting angle, a rotational angle) based on machine learning techniques.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. The capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and/or identifies capacitance variations of the capacitive sense elements for determining a touch or presence of the object associated with the touch sensing surface. The use of the capacitive sense array has offered a convenient and reliable user interface solution that functions under many harsh conditions, so capacitive sense arrays made of capacitive sense elements have been widely used in many industrial and consumer products.

Capacitive sense arrays are applied with styluses to detect position information of the styluses in real time, thereby allowing users to write directly onto a touch display of a computing device such as a smartphone, tablet computer, or laptop. A passive stylus unlike an active stylus does not have electronic components to enable communication with the touch display. It would be beneficial to have a simple, effective, and efficient mechanism to detect orientation information (e.g., a tilting angle) of a passive stylus that is coupled to a touch sensing device.

SUMMARY

Various implementations of this application are directed to methods, systems, devices, and non-transitory computer-readable storage media for detecting orientation information (e.g., tilting angle, azimuth or rotational angle) of a passive stylus. As the passive stylus is positioned in contact with or in proximity to a capacitive sense array, the capacitive sense array is scanned to provide capacitive sense signals, which are processed to extract orientation information (e.g., the tilting angle) of the passive stylus. The passive stylus has a production and operating cost lower than an active stylus. In some embodiments, a position of the passive stylus is estimated based on the capacitive sense signals in real time with respect to a surface of a corresponding touch panel. In some embodiments, tilting and rotational angles of the passive stylus are estimated based on the capacitive sense signals and provided to a host coupled to the corresponding touch panel. A host application may be executed by the host and use the orientation information to enhance user experience, e.g., emulating stokes of real pencils based on the tilting angel and the rotational angle and enhancing the variation in line widths and color tones within drawings.

In some embodiments, after the capacitive sense array is scanned, the corresponding capacitive sense signals are measured and processed to provide a touch map including a single touch image or a sequence of touch image frames. A touch image or image frame includes a plurality of touch pixels that have varying pixel values indicating whether a touch event occurs at each respective touch pixel. In some embodiments, machine learning techniques are implemented on a microcontroller (such as ARM's Cortex-M) to estimate the tilting angle of the passive stylus from the touch map. Machine learning can streamline a training or tuning process to automatically incorporate an impact from additional information (such as sensor sizes and response functions) without requiring manual programming or measurement.

In accordance with one aspect of the application, a method for detecting stylus touch events on a touch sensing surface is performed at a processing device coupled to a capacitive sense array and a stylus. The capacitive sense array includes a plurality of sense electrodes. The stylus includes a conductive tip. The method includes scanning the capacitive sense array to obtain a plurality of capacitive sense signals from the plurality of sense electrodes of the capacitive sense array. The method further includes generating a touch map of the capacitive sense array based on the plurality of capacitive sense signals and applying a machine learning model to process the touch map to determine one or more first orientation parameters of the stylus with respect to a surface of the capacitive sense array. In some embodiments, the one or more first orientation parameters includes one or both of: a tilting angle $\varphi$ measured with respect to the surface of the capacitance sense array and a rotational angle $\theta$ measured with respect to a reference axis on the surface of the capacitance sense array.

Thus, devices, storage media, and computing systems are provided with methods for detecting one or more orientation parameters of a stylus that touches a touch sensing surface, thereby increasing the effectiveness, efficiency, and user satisfaction with such systems. Such methods may complement or replace conventional methods for detecting orientation parameters of a stylus that touches or hovers above the touch sensing surface.

In another aspect, a processing device includes a processor and memory. The processing device is coupled to a capacitive sense array. The capacitive sense array includes a plurality of sense electrodes. The stylus includes a conductive tip. The memory stores one or more programs configured for execution by the processor. The one or more programs include instructions for scanning the capacitive sense array to obtain a plurality of capacitive sense signals from the plurality of sense electrodes of the capacitive sense array. The one or more programs further include instructions for generating a touch map of the capacitive sense array based on the plurality of capacitive sense signals and applying a machine learning model to process the touch map to determine one or more first orientation parameters of the stylus with respect to a surface of the capacitive sense array.

In yet another aspect, an electronic device includes a capacitive sense array including a plurality of sense electrodes, a stylus including a conductive tip, and a processing device coupled to the capacitive sense array. The processing device is configured to scan the capacitive sense array to obtain a plurality of capacitive sense signals from the plurality of sense electrodes of the capacitive sense array. The processing device is configured to generate a touch map of the capacitive sense array based on the plurality of capacitive sense signals and apply a machine learning model to process the touch map to determine one or more first orientation parameters of the stylus with respect to a surface of the capacitive sense array.

Other embodiments and advantages may be apparent to those skilled in the art in light of the descriptions and drawings in this specification.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 is a flowchart for a method of monitoring stylus touch events, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
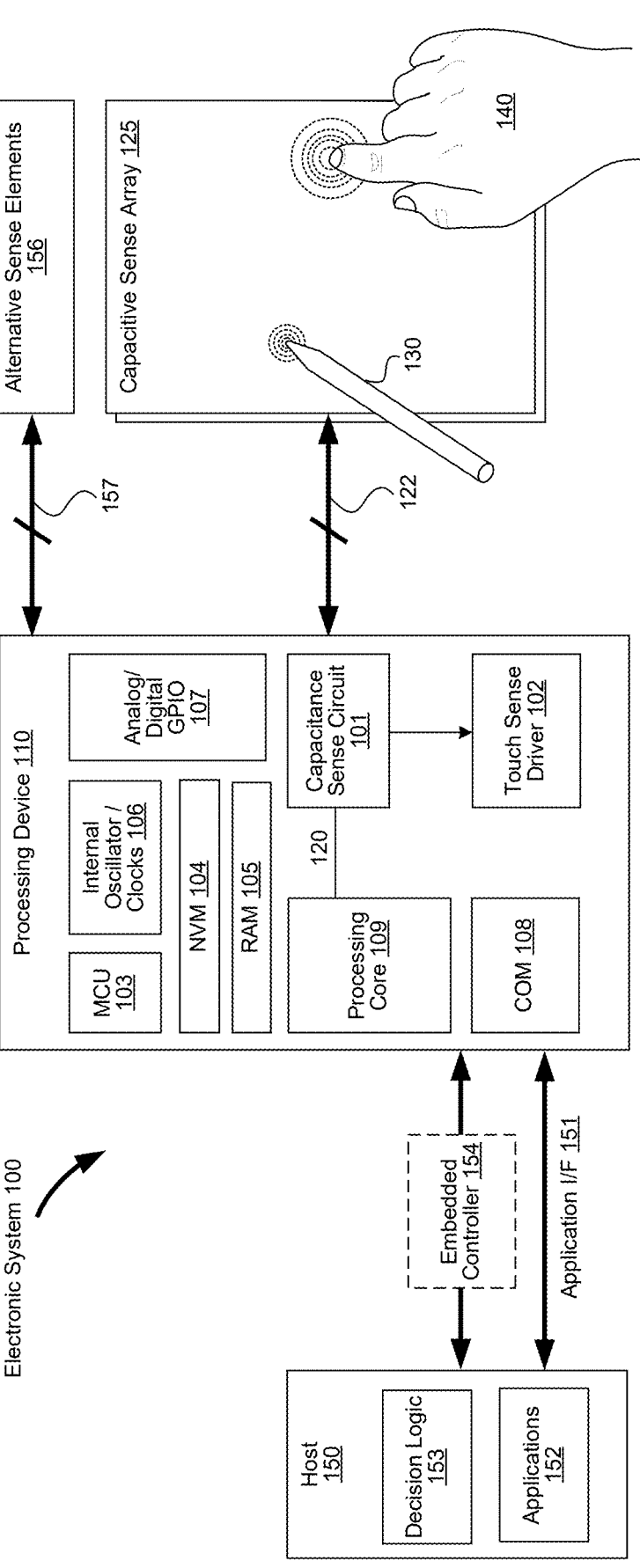
FIG. 1 is a block diagram illustrating an electronic system having a processing device that processes capacitive sense signals, in accordance with some embodiments.

FIG. 1 is a block diagram illustrating an electronic system 100 having a processing device 110, which processes capacitive sense signals, in accordance with some embodiments. The processing device 110 is configured to detect one or more touches proximate to a touch sensing device, such as capacitive sense array 125. The processing device 110 can detect conductive objects, such as touch objects 140 (a finger), a passive or active stylus 130, or any combination thereof. The capacitance sense circuit 101 measures touch data created by a touch using the capacitive sense array 125. The touch may be detected by a single or multiple sensing cells, each cell representing an isolated sense element or an intersection of sense elements (e.g., electrodes) of the capacitive sense array 125. In some embodiments, when the capacitance sense circuit 101 measures mutual capacitance of the touch sensing device (e.g., using the capacitive sense array 125), the processing device 110 acquires a two dimensional capacitive image of the touch sensing object and processes the capacitive image data for peaks and positional information. In some embodiments, the processing device 110 is coupled to a microcontroller (e.g., an external host device 150) that obtains a capacitance touch signal data set from the capacitive sense array 125. In some embodiments, touch detection firmware executing on the microcontroller identifies data set areas that indicate touches, detects and processes peaks, calculates the coordinates, or any combination thereof. The microcontroller can report the precise coordinates and other information to an application processor.

In some embodiments, the electronic system 100 includes a processing device 110, a capacitive sense array 125, a stylus 130, and a host 150. The capacitive sense array 125 may include capacitive sense elements that are electrodes made of conductive materials, such as copper. The sense elements may also be part of an indium-tin-oxide (ITO) panel (sometimes referred to as VCOM). The capacitive sense elements can be used to allow the capacitance sense circuit 101 to measure self-capacitance, mutual capacitance, or any combination thereof. In the depicted embodiment, the electronic system 100 includes the capacitive sense array 125 coupled to the processing device 110 via a bus 122, and the capacitive sense array 125 is configured to provide capacitive sense signals to the processing device via the bus 122. The capacitive sense array 125 may include a multi-dimension capacitive sense array. In some embodiments, the multi-dimension sense array includes multiple sense elements, organized as rows and columns. In some embodiments, the capacitive sense array 125 is a non-transparent capacitive sense array (e.g., PC touchpad). The capacitive sense array 125 may be disposed to have a flat surface profile. In some embodiments, the capacitive sense array 125 has a non-flat surface profile. In some embodiments, other configurations of capacitive sense arrays are be used. For example, instead of vertical columns and horizontal rows, the capacitive sense array 125 may have a hexagon arrangement, or the like, as would be appreciated by one of ordinary skill in the art having the benefit of this disclosure. In some embodiments, the capacitive sense array 125 is be included in an ITO panel or a touch screen panel. More details on the capacitive sense array 125 are explained below with reference to FIGS. 2, 3A, and 3B.

The operations and configurations of the processing device 110 and the capacitive sense array 125 for detecting and tracking a touch object 140 or a stylus 130 are described herein. In short, the processing device 110 is configurable to detect the presence of a touch object 140, the presence of a stylus 130 on the capacitive sense array 125, or any combination thereof. In some embodiments, the capacitive sense array 125 is capacitively coupled with the stylus 130, as opposed to conventional inductive stylus applications.

In some embodiments, the stylus 130 is communicatively coupled to the processing device 110 (specifically, to a communication module 108) via a wireless communication link 124 (e.g., a Bluetooth link). The processing device 110 provides timing and communication parameters to the stylus 130 in an uplink transmission via the wireless communication link 124. The stylus 130 recovers transmission parameters from the timing and communication parameters, and generates drive signals to drive the conductive tip and the conductive wire module. In an example, the transmission parameters include one or more of: the amplitude, the delay, the transmission frequency, and the number of transmission pulses for a respective drive signal driving a conductive tip or a wire module of the stylus 130. The respective drive signal is therefore defined for each of the conductive tip and wire module of the stylus 130 according to the corresponding transmission parameters.

In some embodiments, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). In some embodiments, the digital block array is configured to implement a variety of digital logic circuits (e.g., DACs, digital filters, and/or digital control systems) using configurable user modules ("UMs"). The digital block array may be coupled to a system bus. The processing device 110 may also include memory, such as random access memory ("RAM") 105 and non-volatile memory ("NVM") 104. The RAM 105 may be static RAM ("SRAM"). The non-volatile memory 104 may be flash memory, which may be used to store firmware (e.g., control algorithms executable by the processing core 109 to implement operations described herein). The processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the capacitive sense array 125 (e.g., determining whether an object is detected on or in proximity to the touch sensing surface), resolve where the object is on the capacitive sense array (e.g., determining the location of the object), track the motion of the object or the stylus, or generate other information related to an object detected at the capacitive sense array 125. In some embodiments, the processing device 110 further includes a touch sense driver 102 coupled to the capacitance sense circuit 101. The touch sense driver 102 functions in conjunction with the processing core 109, and is configured to implement part or all of the above touch detection functions of the processing core 109. In some embodiments, the processing core 109 includes a capacitance sense circuit 101. In some embodiments, the processing core 109 performs some or all the functions of capacitance sense circuit 101. Likewise, the touch sense driver 102 may include part or all of the capacitance sense circuit 101, and perform some or all the functions of capacitance sense circuit 101.

In some embodiments, the processing core 109 generates a multi-touch enable signal 120, which that controls the capacitance sensing circuit 101 to detect touch locations. The multi-touch enable signal 120 is used to enable a touch sensing state. In the touch sensing state, self- or mutual-capacitance of sense electrodes of the capacitive sense array 125 is scanned in capacitive sense scans. One or more touch locations are thereby detected if one or more objects touch the touch sensing surface of the electronic system 100.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some embodiments, configurable UMs. The analog block array may also be coupled to the GPIO 107.

In some embodiments, the capacitance sense circuit 101 is integrated into the processing device 110. The capacitance sense circuit 101 includes analog I/O for coupling to an external component, such as a touch-sensor pad (not shown), a capacitive sense array 125, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some embodiments, the capacitance sense circuit 101 operates using a charge accumulation circuit, a capacitance modulation circuit, or other capacitance sensing methods known by those skilled in the art. In some embodiments, other capacitance sensing circuits may be used. The mutual capacitive sense arrays, or touch screens, as described herein, may include a transparent, conductive sense array disposed on, in, or under either a visual display itself (e.g., LCD monitor), or a transparent substrate in front of the display.

The capacitive sense array 125 includes a plurality of sense electrodes. When a touch object, such as a finger or stylus, approaches the capacitive sense array 125, the object causes a decrease in mutual capacitance between some of the sense electrodes. In some embodiments, the presence of a finger increases the capacitance of the electrodes to the environment (Earth) ground, typically referred to as self-capacitance change. In some embodiments, the sense electrodes of the capacitive sense array 125 are configured to operate as transmit (TX) electrodes and receive (RX) electrodes of a mutual capacitive sense array in a first mode to detect touch objects, and to operate as electrodes of a coupled-charge receiver in a second mode to detect a stylus 130 on the same electrodes of the capacitive sense array 125.

In the first mode, a mutual capacitance is measured at an intersection of an RX electrode and a TX electrode when a transmit signal provided at the RX electrode is coupled to the TX electrode. Utilizing the change in mutual capacitance, the location of the finger on the capacitive sense array 125 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersections of electrodes.

In some embodiments, the processing device 110 calibrates the sense elements (intersections of RX and TX electrodes) by determining baselines for the sense elements. In some embodiments, interpolation is used to detect finger position at higher resolution than the spatial pitch of the sense electrodes of the capacitive sense array 125, and various types of coordinate interpolation algorithms are optionally used to detect the center location of a touch.

The processing device 110 may include internal oscillator/clocks 106 and a communication block ("COM") 108. In some embodiments, the processing device 110 includes a spread-spectrum clock (not shown). The oscillator/clocks 106 provides clock signals to one or more of the components of processing device 110. The communication block 108 may be used to communicate with an external component, such as an application processor 150, via an application interface ("I/F") line 151. In some embodiments, the processing device 110 may also be coupled to an embedded controller 154 to communicate with the external components, such as a host 150. In some embodiments, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some embodiments, the components of the processing device 110 are one or more separate integrated circuits and/or discrete components. In some embodiments, the processing device 110 includes one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is noted that the embodiments described herein are not limited to having a configuration of a processing device coupled to an application processor. Some embodiments include a system that measures the capacitance on the sensing device and sends the raw data to a host computer 150 where it is analyzed by an application. In effect, the processing that is done by the processing device 110 may also be done in the application processor. Specifically, in some embodiments, instead of performing the operations of the processing core 109 in the processing device 110, the processing device 110 sends the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other embodiments, the processing device 110 is the host 150.

The capacitance sense circuit 101 may be integrated into the IC of the processing device 110, or in a separate IC. In some embodiments, descriptions of capacitance sense circuit 101 are generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all the components described above. In some embodiments, the electronic system 100 includes fewer than all of the components described above.

In some embodiments, the electronic system 100 is used in a tablet computer. In some embodiments, the electronic device is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook embodiments. Embodiments can be used in other capacitive sensing devices, such as a touch-sensor slider (not shown) or touch-sensor buttons (e.g., capacitance sensing buttons). In some embodiments, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing embodiments may be used in conjunction with non-capacitive sensing elements, including but not limited to pick buttons, sliders (e.g., display brightness and contrast), scroll-wheels, multi-media control (e.g., volume and track advance), handwriting recognition, and numeric keypad operation.

In some embodiments, the electronic system 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

Figure 2:
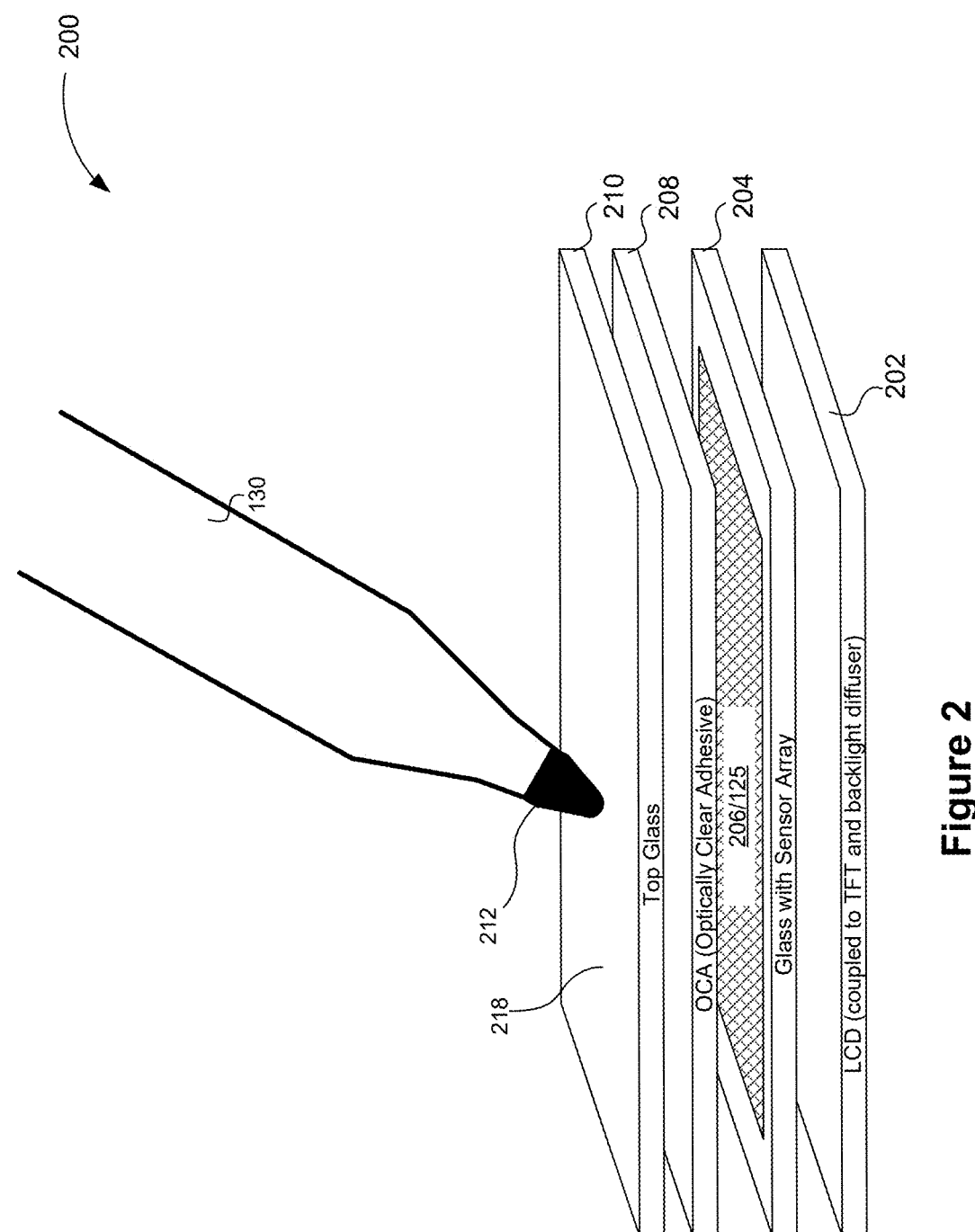
FIG. 2 illustrates an example touch screen assembly that includes a capacitive sense array 125, in accordance with some embodiments.

FIG. 2 illustrates an example touch screen assembly 200 that includes a capacitive sense array 125, in accordance with some embodiments. The touch screen assembly 200 includes a liquid crystal display (LCD) 202 overlaid by the glass 204. A sensor pattern 206 is constructed on the surface of the glass 204 to form the capacitive sense array 125. Optionally, as shown in FIG. 2, the sensor pattern 206 is constructed on a top surface of the glass 204 that faces away from the LCD 202. Optionally, the sensor pattern 206 is constructed on the bottom surface of the glass 204, which faces the LCD 202. Optically clear adhesive (OCA) 208 is used to bond the top glass 210 to the surface of the glass 204 on which the sensor pattern 206 is constructed, thus protecting the sensor pattern 206.

Figure 3B:
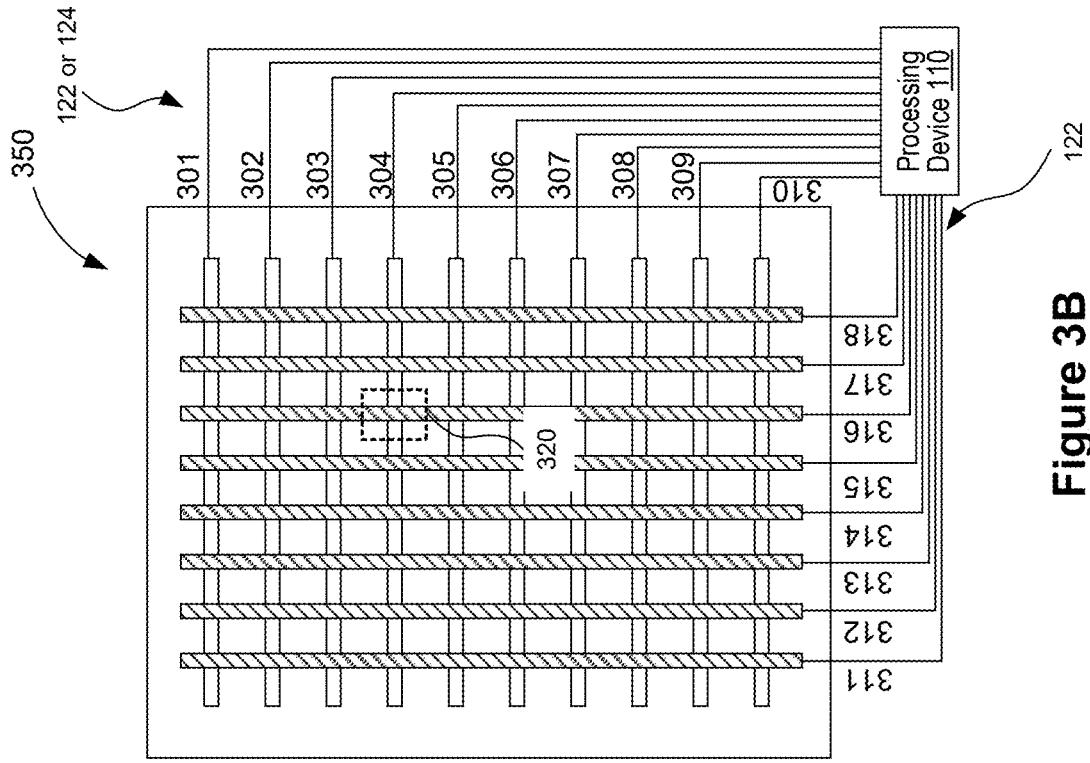
FIG. 3B illustrates an example orthogonal electrode matrix used to form a capacitive sense array, in accordance with some embodiments.

Optionally, the sensor pattern 206 is a diamond pattern (FIG. 3A) or a row-column pattern (FIG. 3B). The capacitive sense array 125 formed from the sensor pattern 206 includes row and column sense electrodes, which can be expressed as a matrix of the intersections between row and column electrodes. In some embodiments, the row and column sense electrodes are formed on two conductive layers that are electrically insulated from each other, and both of the conductive layers are formed on the top or bottom surface of the glass 204. The resolution of the capacitive sense array 125 is represented as the product of the number of columns and the number of rows. For example, when a capacitive sense array 125 has N row electrodes and M column electrodes, the number of intersections is N×M, and the resolution of the capacitive sense array 125 is N×M as well.

Additionally, the raw resolution of the capacitive sense array 125 is determined based on the sensor size, and the post-processing resolution of the capacitive sense array 125 is finer than the sensor size. In an example, the sensor size is 4.5 mm×4.5 mm. The raw resolution of the capacitive sense array 125 is determined based on the sensor size, and the post-processing resolution can be less than $\frac{1}{16}$ mm.

The LCD 202 is electrically coupled to a thin film transistor (TFT) array and a backlight diffuser that are disposed below the LCD 202. The TFT array is configured to drive the LCD 202 electrically, and the backlight diffuser is configured to provide substantially uniform illumination to the LCD 202. The touch sensing portion is above the LCD layer and forms the capacitive sense array 125. In some embodiments, each electrode layer can be used independently to measure the self-capacitance between the electrode and (Earth or system) ground to form a capacitive sense array 125. The touch electrodes can be in the same layer or on separate layers. In some embodiments, the Pixel electrodes in the LCD layer 202 are used as electrodes for capacitive measurement to (Earth or system) ground and form a capacitive sense array 125. In some embodiments, the conductive routing to circuitry operating the LCD is used as electrodes for capacitive measurement to (Earth or system) ground and form a capacitive sense array 125.

In some embodiments, the capacitance sense circuit 101 scans the capacitive sense signals from the touch sensing device (e.g., using the capacitive sense array 125). The processing device 110 acquires a two dimensional (2D) capacitive image (e.g., a touch map 406 in FIG. 4) of the stylus 130 and processes the 2D capacitive image data for signal peaks and positional information. Further, in some embodiments, the 2D capacitive image is a combination of the capacitive sense signals collected from all of the capacitive sense electrodes of the capacitive sense array 125. Alternatively, in some embodiments, the 2D capacitive image is a subset of the capacitive sense signals. The subset of the capacitive sense signals corresponds to a subset of capacitive sense electrodes that are in proximity to or in contact with the stylus 130 and less than all of the capacitive sense electrodes of the capacitive sense array 125.

Figure 3A:
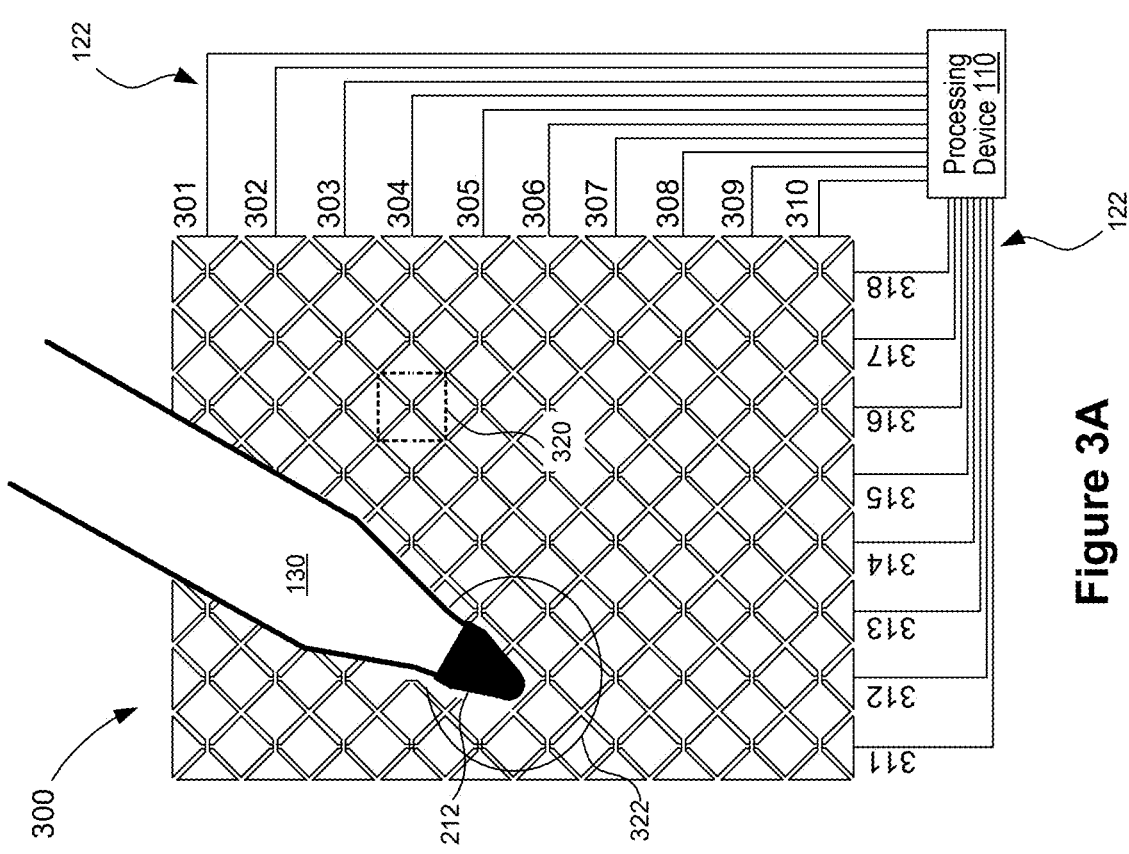
FIG. 3A illustrates a solid diamond pattern used to form a capacitive sense array, in accordance with some embodiments.

FIG. 3A illustrates a solid diamond pattern 300 used to form a capacitive sense array 125 in accordance with some embodiments. FIG. 3B illustrates an example orthogonal electrode matrix 350 used to form a capacitive sense array 125 in accordance with some embodiments. When the solid diamond pattern 300 or the orthogonal electrode matrix 350 is applied in a capacitive sense array 125, the capacitive sense array 125 includes a plurality of row sense electrodes 301-310 and a plurality of column sense electrodes 311-318. The row and column sense electrodes 301-318 are connected to a processing device 110 (which may include the functionality of a capacitance sensing circuit 101) by the bus 122, and configured to provide capacitive sense signals to the processing device 110. In some embodiments, the processing device 110 may perform TX-RX scans of the capacitive sense array 125 to measure the mutual capacitance value associated with each of the intersections between a row sense electrode and a column sense electrode in the capacitive sense array 125. The measured mutual capacitances are further processed at the processing device or at a host 150 to determine higher resolution locations of one or more contacts on the capacitive sense array 125. Alternatively, in some embodiments, each of the sense electrodes 301-318 can be used independently to measure the self-capacitance between the electrode and (Earth or system) ground to form a capacitive sense array 125.

Referring to FIG. 3A, the electrodes of the capacitive sense array 125 form a single solid diamond (SSD) pattern. In some embodiments, each intersection between a row electrode and a column electrode defines a unit cell. Each point within the unit cell is closer to the associated intersection than to any other intersection. For example, the unit cell 320 contains the points that are closest to the intersection between the row electrode 304 and the column electrode 316.

In some embodiments, a capacitive touch sensing system collects data from the entire touch sensing surface of the capacitive sense array 125 by performing a scan to measure capacitances of the unit cells in the touch sensing surface, then processes the touch data serially or in parallel with a subsequent scan. For example, a system that processes touch data serially may collect raw capacitance data from each unit cell of the entire touch sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition. In some embodiments, the capacitive touch sensing system performs mutual capacitance sensing of the touch sensing surface (e.g., the sense array 125) by individually sensing each intersection between a row electrode and a column electrode. Thus, the total number of sense operations for a capacitive sense array (e.g., the sense array 125) having X rows and Y columns is X×Y. In some embodiments, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

Additionally, although the row and column electrodes appear as bars, elongated rectangles or diamonds in FIGS. 3A and 3B, various tessellated shapes (e.g., rhomboids and chevrons) may also be used.

In some embodiments, referring to FIG. 3A, a stylus 130 is a passive stylus that has a conductive tip 212 and does not include any wire module or signal transmitter. When the conductive tip 212 of the stylus 130 is positioned in proximity to or in contact with a touch sensing surface of the capacitive sense array 125, self-capacitance of a first subset 322 of capacitive sense electrodes of the capacitive sense array 125 changes because their associated electrical field measured with respect to ground is interfered with by the conductive tip. Mutual capacitance of the first subset 322 of capacitive sense electrodes of the capacitive sense array 125 changes because an electrical field formed among these electrodes is interfered with by the conductive tip 212. Stated another way, self-capacitance, mutual capacitance, or both of a subset of capacitive sense electrodes in the capacitive sense array 125 change in response to the conductive tip 212 of the stylus 130 being positioned in proximity to or in contact with the touch sensing surface.

Referring to FIGS. 3A and 3B, in some embodiments, capacitive sensors of the capacitive sense array 125 are made from more than one electrode layers (e.g., a column electrode layer and a row electrode layer). In some embodiments not shown, capacitive sensors of the capacitive sense array 125 are made from a single electrode layer, and the single electrode layer is configured to provide a plurality of individual array element electrodes. Independently of whether the capacitive sense array 125 has one or multiple electrode layers, the capacitive sensors of the capacitive sense array 125 are coupled to a stylus 130 to detect one or more first orientation parameters of the stylus 130.

Figure 4A:
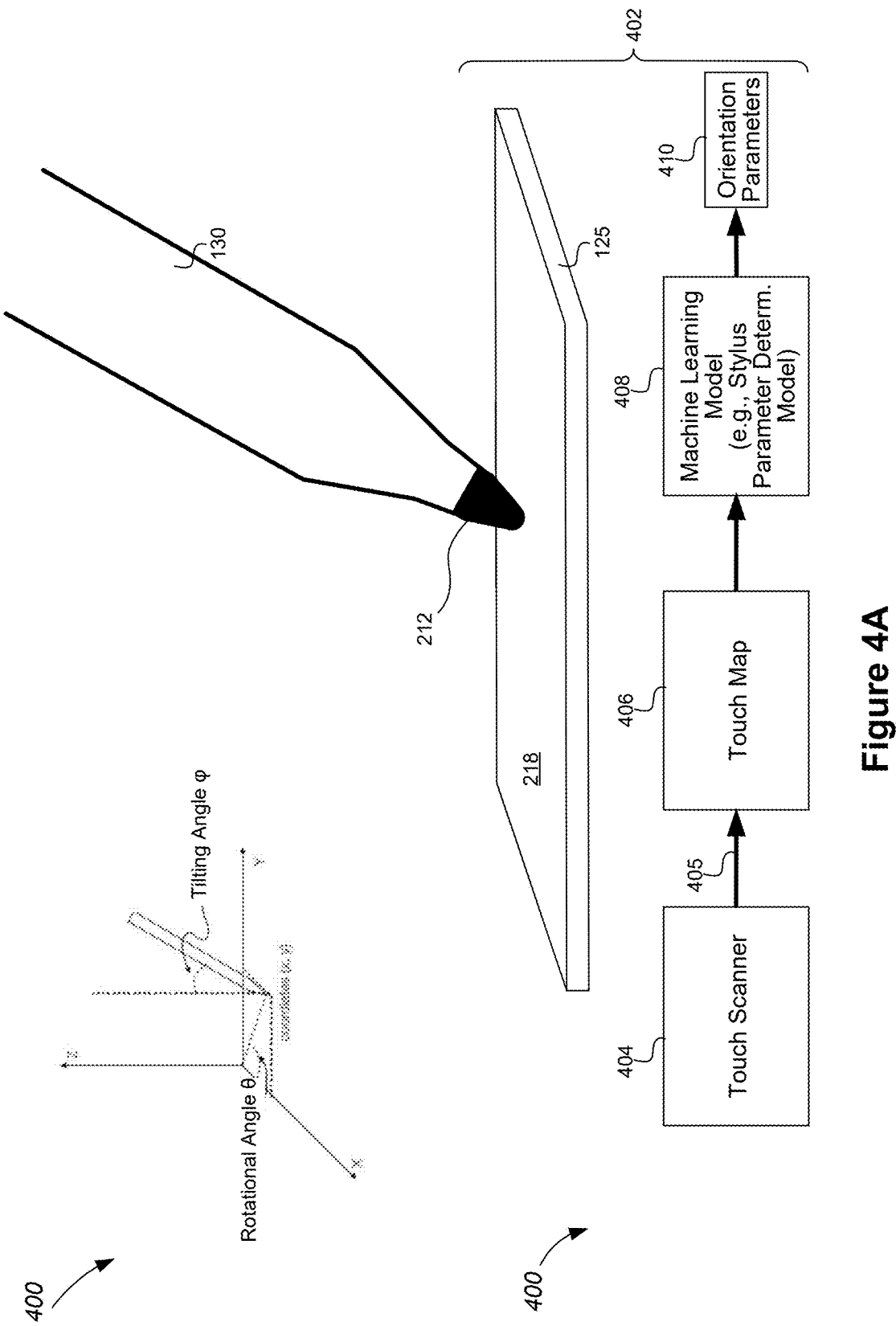
FIG. 4A is a block diagram of a stylus sensing subsystem of an electronic system that determines orientation information of a stylus using a machine learning model, in accordance with some embodiments.

FIG. 4A is a block diagram of an example stylus sensing subsystem 400 of an electronic system 100 that determines orientation information of a stylus 130 using a machine learning model 408 (e.g., a stylus parameter determination model), in accordance with some embodiments. The stylus sensing subsystem 400 includes a panel portion 402 configured to be coupled to the stylus 130. The stylus 130 includes a conductive tip 212 and does not include any active circuit. In some embodiments, the stylus 130 is a specialized product sold to work with the electronic system 100. Alternatively, in some embodiments, the stylus 130 includes a conductive tip cover configured to mate with a writing tool (e.g., a pen, a pencil). The stylus 130 covers a tip of the writing tool when the stylus sensing subsystem 400 is applied to sense a touch event associated with the stylus 130, thereby conveniently converting the writing tool to a stylus recognizable by the stylus sensing subsystem 400.

The panel portion 402 includes a capacitive sense array 125 and a processing device 110 (see FIG. 1) that further includes a touch scanner circuit 404. In some embodiments, the touch scanner circuit 404 is implemented by at least the processing core 109 and the capacitance sense circuit 101 in the processing device 110 (see FIG. 1). The touch scanner circuit 404 scans the capacitive sense array 125 to obtain a plurality of capacitive sense signals 405 from the plurality of capacitive sense electrodes of the capacitive sense array 125, and generates a touch map 406 of the capacitive sense array 125 based on the plurality of capacitive sense signals 405. The touch map 406 indicates an inseparable impact of the tip 212 on the capacitive sense array 125. In some embodiments, the touch map 406 has an image resolution that is identical to the array resolution of the plurality of capacitive sense electrodes of the capacitive sense array 125. Each element of the touch map 406 has a respective capacitive value that is determined based on a respective subset of the plurality of capacitive sense signals 405 (e.g., measured from a single capacitive sense electrode or from a subset of related capacitive sense electrodes). Alternatively, in some embodiments, the touch map 406 has an image resolution that is lower than an array resolution of the plurality of capacitive sense electrodes of the capacitive sense array 125. The touch scanner circuit 404 determines a peak of the plurality of capacitive sense signals 405 that is measured by a peak electrode of the plurality of capacitive sense electrodes of the capacitive sense array 125, and identifies a subset of the plurality of capacitive sense electrodes including the peak electrode. The touch map 406 corresponds to the subset of the plurality of capacitive sense electrodes (i.e., less than the entirety of the capacitive sense array 125).

In some embodiments, when the stylus sensing subsystem 400 determines that the touch map 406, the stylus sensing subsystem 400 determines that a touch event has occurred on or near the surface of the capacitive sense array 125 and that the touch event corresponds to a conductive object touching, or hovering above, the surface of the capacitive sense array 125. The conductive object induces the plurality of capacitive sense signals 405 on the subset of sense electrodes. The stylus sensing subsystem 400 further differentiates a touch by a passive stylus touch from a finger touch, and thereby determines that the touch event includes a passive stylus touch distinct from a finger touch. In some situations, the passive stylus touch impacts a number of capacitive sense elements less than a threshold element number. In some situations, the passive stylus touch corresponds to a peak value on the touch map 406, and the peak value differs from values of neighboring pixels beyond a difference threshold. For example, in some embodiments, the stylus sensing subsystem 400 determines that a signal-to-noise ratio (SNR) of the plurality of capacitive sense signals 405 meets a signal quality criterion, identifies an area that corresponds to the touch event and includes at least the subset of capacitive sense array, and determines a signal stress value based on a peak signal level of the plurality of capacitive sense signals 405 on the touch map 406.

In some embodiments, a machine learning model 408 is applied to process the touch map 406 to determine one or more orientation parameters 410 of the stylus 130 with respect to a surface 218 of the capacitive sense array 125 (FIG. 2). In some embodiments, the machine learning model 408 includes a convolutional neural network (CNN), including a plurality of 2D convolutional layers and a fully-connected output layer. In some embodiments, the machine learning model 408 includes one or more of: a multi-stage support vector machine (SVM), a recursive neural network (RNN), a residual network (ResNet), and an encoder-decoder network (e.g., a U-net). In some situations, the ResNet and encoder-decoder are applied, but complicated and expensive to implement. As an alternative, an RNN or CNN based network is used instead of a ResNet for implementing the machine learning model 408. In some embodiments, the machine learning model 408 includes a support vector machine (SVM) that may have a plurality of stages and identify a hyperplane that distinguishably segregates capacitive sense signals 405 of different classes, thereby determining the one or more orientation parameters 410 of the stylus 130. In some embodiments, the machine learning model 408 includes a neural network distinct from the CNN.

In some embodiments, the machine learning model 408 is trained by a server computer, and provided to the processing device 110 to process the touch map 406. In some embodiments, the machine learning model 408 is stored in local memory of the electronic system 100 without encryption, and extracted from the local memory to process the touch map 406. In some embodiments, the machine learning model 408 is encrypted and stored in local memory of the electronic system 100. The machine learning model 408 is extracted, and decrypted to process the touch map 406. In some embodiments, the machine learning model 408 includes a number of layers, and the number is less than 10, such that the machine learning model 408 can be implemented efficiently in firmware. Such a machine learning model 408 typically does not include a CNN.

In some embodiments, the one or more orientation parameters 410 determined from the panel portion 402 includes one or both of: a tilting angle φ measured with respect to the surface 218 of the capacitance sense array 125 and a rotational angle θ (also called Azimuth angle θ) measured with respect to a reference axis (e.g., x-axis) on the surface 218 of the capacitance sense array 125. In some embodiments, the tilting angle φ is in a tilting range with a tilting resolution. In some embodiments, the tilting range is 0-45 degrees, 5-75 degrees, 0-60 degrees, or 0-90 degrees. In some embodiments, the tilting resolution is 15 degrees. In some embodiments, the tilting resolution varies based on a value of the tilting angle φ within the range for example, in one sub-range of the range of tilting angles φ (e.g., 30-45 degrees), the resolution is higher than in another sub-range (e.g., 0-15 degrees). In some embodiments, the tilting resolution is non-uniform in a respective tilting range.

Figure 4B:
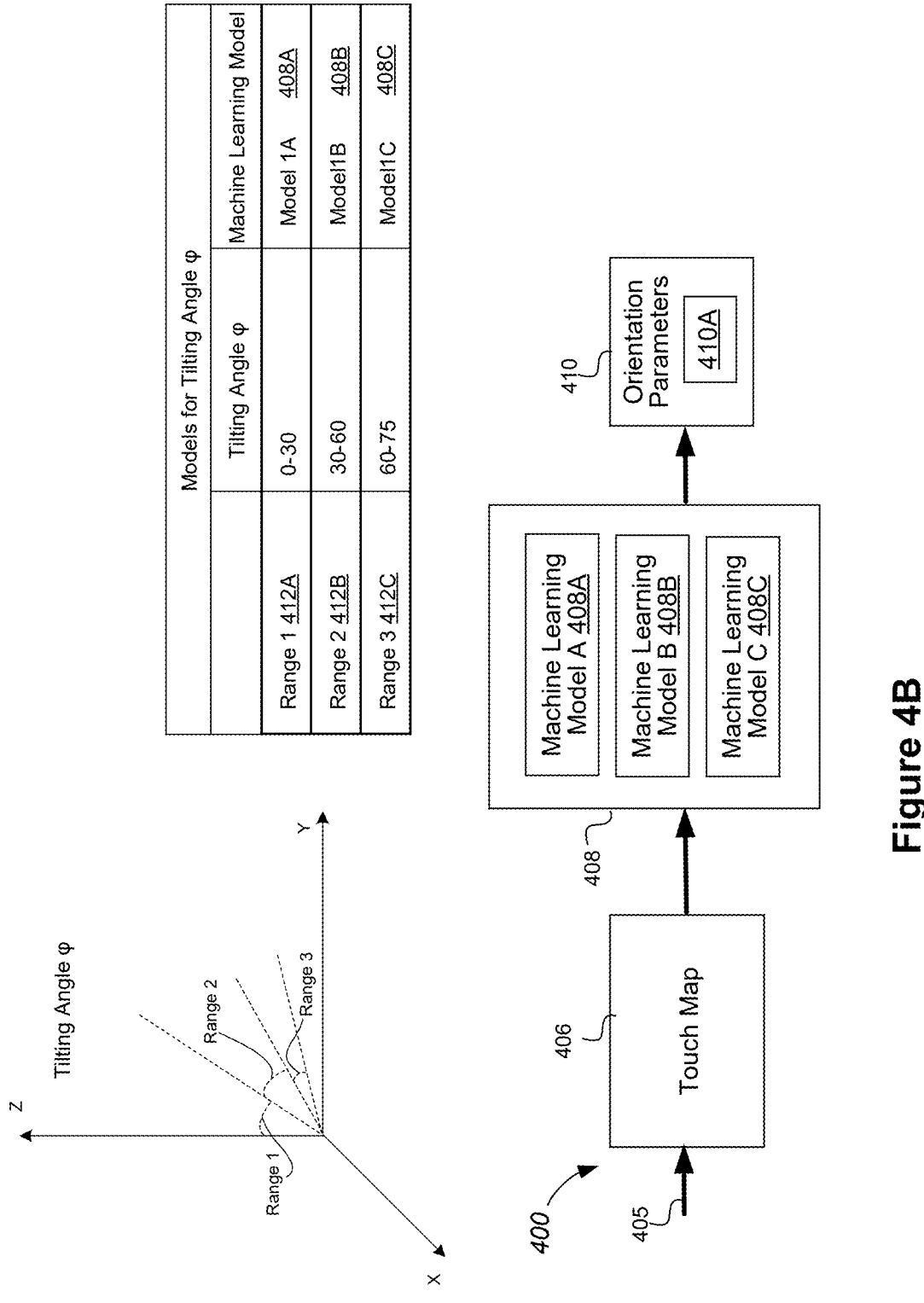
FIGS. 4B and 4C illustrate two stylus sensing subsystems each of which applies a plurality of machine learning models to determine orientation information of a stylus, in accordance with some embodiments.
Figure 4C:
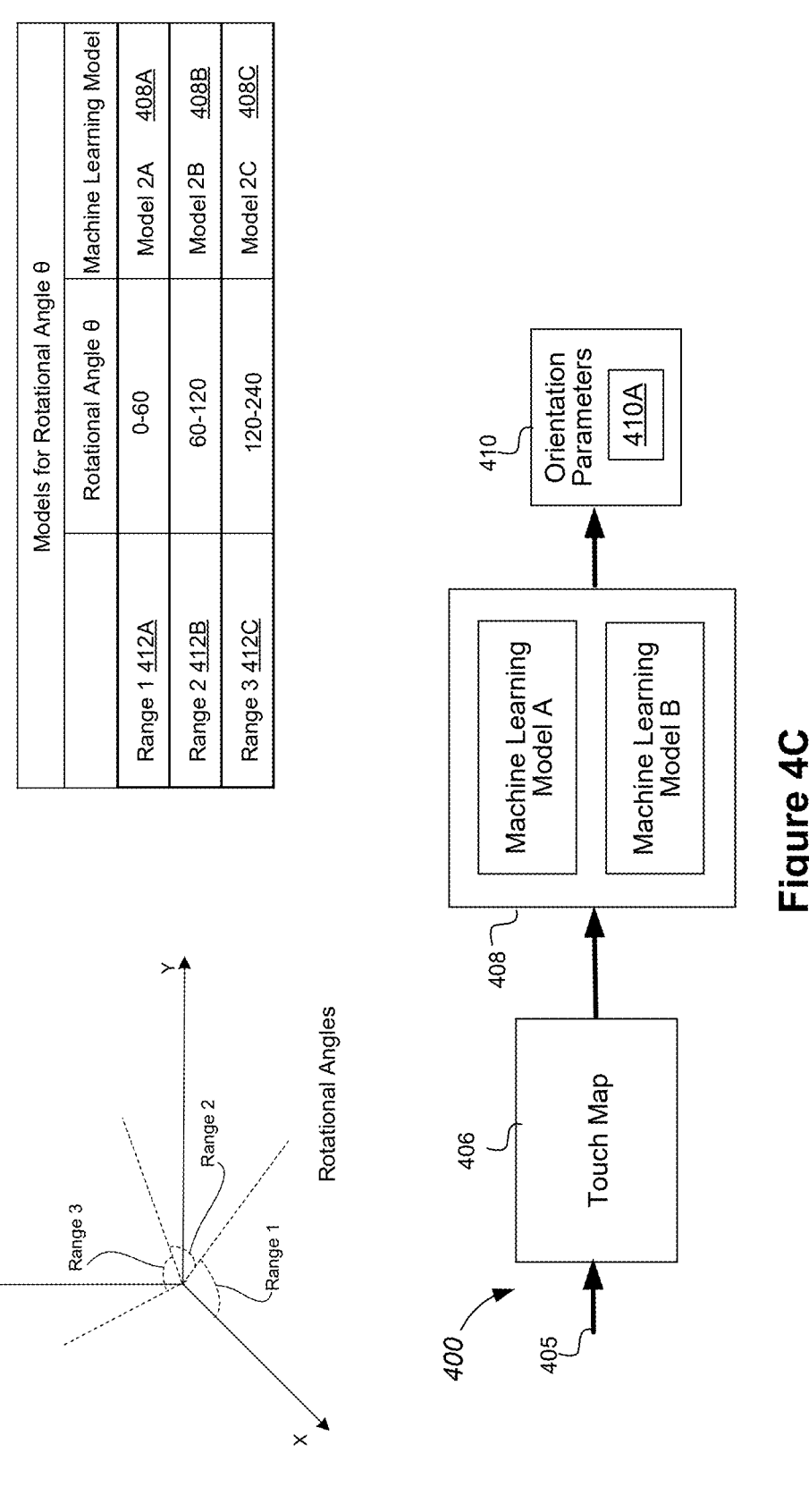

FIGS. 4B and 4C illustrate two stylus sensing subsystems 400B and 400C each of which applies a plurality of machine learning models 408 (e.g., models 408A and 408B) to determine orientation information of a stylus 130, in accordance with some embodiments.

The plurality of capacitive sense signals 405 are captured at a first time. A touch map 406 is generated based on the plurality of first capacitive sense signals 405. The machine learning model 408 is applied to process the touch map 406 and to determine one or more first orientation parameters 410 of the stylus 130 with respect to the surface 218 of the capacitive sense array 125. In some embodiments, the one or more orientation parameters include a rotational angle θ determined with respect to a reference axis that passes the stylus position and lies on the surface of the capacitance sense array. In some embodiments, the rotational angle θ is in a rotation range (e.g., 0-360 degrees) with a rotation resolution (e.g., 45 degrees). For example, the rotational angle θ has a value selected from 0, 45, 90, 135, 180, 225, 270, 315, and 360 degrees. In some embodiments, the rotation range is non-uniform in a respective rotation range. For example, the rotational angle θ has a value selected from 0, 15, 30, 45, 90, 135, 180, 210, 240, 270, 300, 315, and 360 degrees.

In some embodiments, the one or more orientation parameters 410 includes a first orientation parameter 410A (e.g., the tilting angle φ in FIG. 4B, the rotational angle θ in FIG. 4C). In some embodiments, the stylus sensing subsystem selects a first machine learning model 408A to process the capacitive sense signals 405, and determines the first orientation parameter 410A in a first orientation range 412A with a first orientation resolution. In some embodiments, the stylus sensing subsystem selects a second machine learning model 408B, and determines the first orientation parameter 410B in a second orientation range 412B with a second orientation resolution distinct from the first orientation resolution. In some situations, the first and second orientation ranges 412A and 412B entirely or partially overlap, and different machine models 408A and 408B are applied to result in different orientation resolutions. In some situations, the first and second orientation ranges 412A and 412B does not overlap or only partially overlap, and different machine models 408A and 408B are applied to result in different orientation resolutions for different orientation ranges 412A and 412B.

In some embodiments, the tilting range may be 0-45 degrees, 5-75 degrees, 0-60 degrees, or 0-90 degrees. In some embodiments, the tilting resolution is 15 degrees. In some embodiments, the tilting resolution varies based on a value of the tilting angle within the range. The resolution associated with one sub-range of the range of tilting angles (e.g., 30-45 degrees) may be higher than in another sub-range (e.g., 0-15 degrees). For example, referring to FIG. 4A, the first machine learning model 1A (408A) is applied to determine the tilting angle φ in Range 1 (412A) of 0-30 degrees, and the second machine learning model 1B (408B) is applied to determine the tilting angle φ in a Range 2 (412B) of 30-60 degrees. The third machine learning model 1C (408C) is applied to determine the tilting angle φ in a Range 3 (412C) of 60-75 degrees.

In some embodiments, the rotation resolution is 30 degrees. In some embodiments, the rotation range is from 0 to 330 degrees. In some embodiments, the machine learning model 408 is trained to provide discrete values of the rotational angle based on the rotation angle and the rotation resolution. In an example, referring to FIG. 4B, the first machine learning model 2A (408A) is applied to determine the rotational angle θ in a Range 1 (412A) of 0-60 degrees, and the second machine learning model 2B (408B) is applied to determine the rotational angle θ in a Range 2 (412B) of 60-120 degrees. The third machine learning model 2C (408C) is applied to determine the rotational angle θ in a Range 3 (412C) of 120-240 degrees.

Alternatively, in some embodiments, the capacitive sense signals 405 are mapped to the touch map 406. The machine learning model 408 is applied to process the touch map 406 to determine whether the stylus hovers above or physically touches the surface 218 of the capacitive sense array 125 in addition to the one or more orientation parameters 410. Additionally, in some embodiments, the machine learning model 408 determines the distance from the surface 218 of the capacitive sense array 125.

Figure 5:
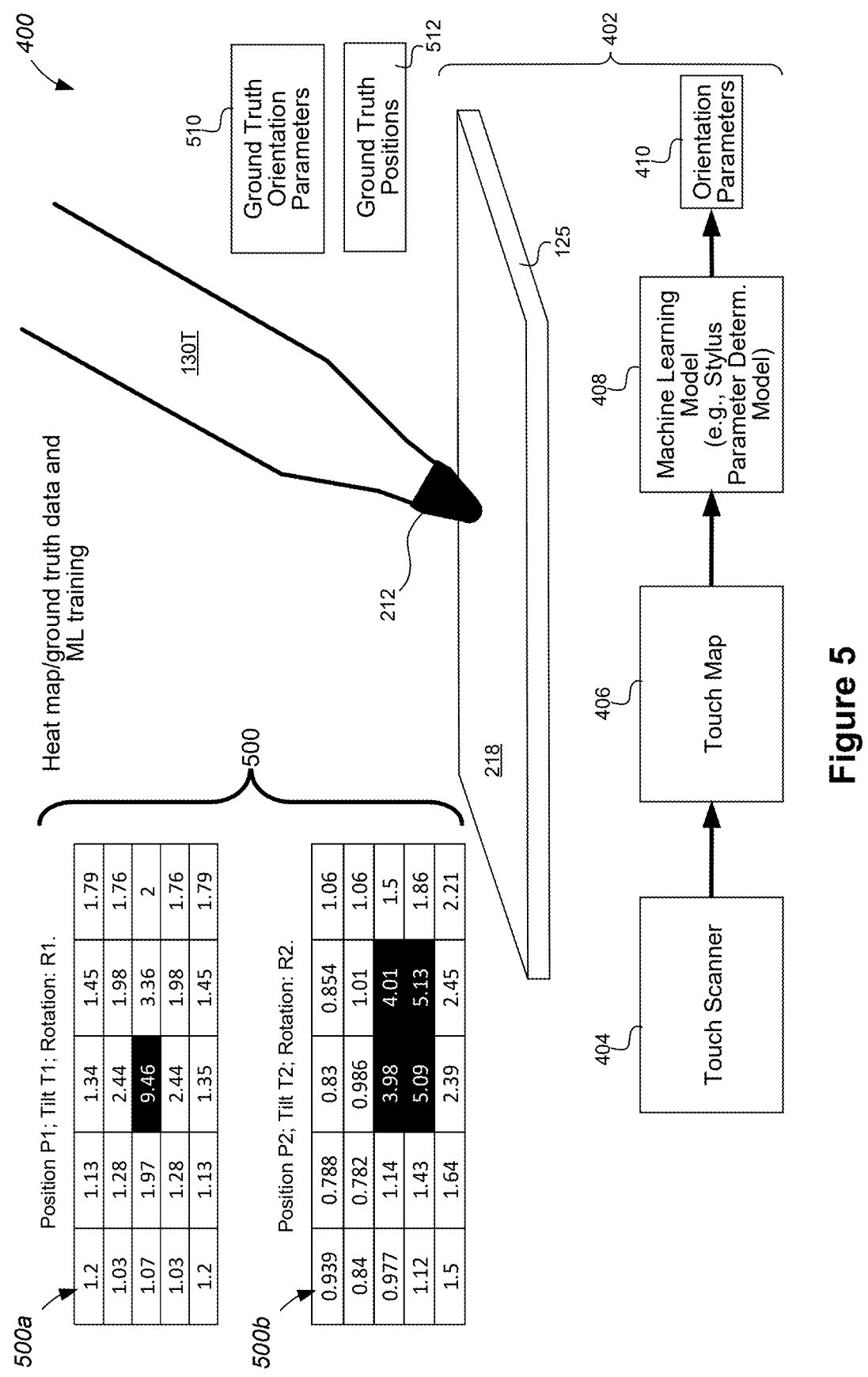
FIG. 5 is a block diagram of a stylus sensing subsystem that applies a machine learning model trained using touch maps, in accordance with some embodiments.

FIG. 5 is a block diagram of a stylus sensing subsystem 400 that applies a machine learning model 408 trained using touch maps, in accordance with some embodiments. The machine learning model 408 (e.g., a stylus parameter determination model) is trained using a plurality of training touch maps 500 in a supervised, semi-supervised, and unsupervised manner to determine a position corresponding to a tip of the stylus 130, one or more orientation parameters 410 (e.g., tilting angle, rotational angle) with respect to the surface 218, whether the stylus 130 hovers above or physically touches the surface 218, and/or a distance from the surface 218 of the capacitive sense array 125.

In some embodiments, a robot holds a passive stylus 130 to contact the touch sensing surface of the stylus sensing subsystem 400 with a known position of the stylus and known orientation parameters. The touch scanner circuit 404 scans the capacitive sense array 125 to obtain a plurality of capacitive sense signals 405 from the plurality of capacitive sense electrodes of the capacitive sense array 125, and generates a training touch map 500 of the capacitive sense array 125 based on the plurality of capacitive sense signals 405. The training touch map 500 is applied jointly with the known position and known orientation parameters, which are used as ground truth, to train the machine learning model 408 in a supervised manner. For example, the training touch map 500a corresponds to position P1, tilting angle T1, and rotation angle R1, and the training touch map 500b corresponds to position P2, tilting angle T2, and rotation angle R2. During training, the machine learning model 408 is applied to process the training touch maps 500a and 500b, and model parameters of the machine learning model 408 are adjusted to match processing outputs to the respective known position and orientation parameters until a loss of the machine learning model 408 satisfies a model training criterion.

More specifically, in some embodiments, the stylus sensing subsystem 400 obtains the plurality of training touch maps 500 for a plurality of test styluses 130T and a set of ground truth orientation parameters 510 Each training touch map 500 corresponds to a subset of respective ground truth orientation parameters 510 of a respective test stylus 130T. A stylus parameter determination model is trained using the plurality of training touch maps 500 and the set of ground truth orientation parameters 510. Further, in some embodiments, the stylus sensing subsystem 400 obtains a set of ground truth stylus positions 512 of the plurality of test styluses 130T. Each training touch map 500 corresponds to a respective ground truth stylus position 512 of the respective test stylus 130T, and the stylus parameter determination model is trained using the plurality of training touch maps 500, the set of ground truth orientation parameters 510, and the set of ground truth stylus positions 512. The stylus parameter determination model is applied to process the touch map 406 and determine the stylus position of the passive stylus 130.

In some embodiments, a position of the stylus 130 corresponds to a touch pixel having a peak value in the touch map 406 (e.g., the touch pixel having a peak value of 9.46 in the training touch map 500a). The peak value of touch pixel differs from values of neighboring pixels beyond a difference threshold. In some embodiments, a position of the stylus 130 corresponds to a set of touch pixels having multiple peak values in the touch map 406, and each peak value differs from values of neighboring pixels beyond the difference threshold. The machine learning model 408 may be trained to recognize these embodiments and provide a position resolution higher than a pixel resolution of the capacitive sense electrodes of the capacitive sense array 125.

In some embodiments, the stylus parameter determination model is applied to select one of a plurality of predefined orientation values for each of the one or more orientation parameters 410. For example, the rotational angle θ has a value selected from 0, 45, 90, 135, 180, 225, 270, 315, and 360 degrees. In some embodiments, the stylus parameter determination model outputs a vector including a plurality of features. One of the plurality of features corresponds to the rotational angle θ. In an example, the one of the plurality of features corresponds to the rotational angle θ is equal to 225 degrees. In another example, the one of the plurality of features corresponds to the rotational angle θ is an indicator, e.g., equal to 3, indicating the rotational angle θ is equal to the third value in a predefined sequence of rotational angle values. In yet another example, the predefined sequence of rotational angle values has 9 rotational angle values, and the vector outputted by the stylus parameter determination model includes a set of 9 features representing probabilities of having distinct rotational angle values in the predefined sequence.

Figure 6:
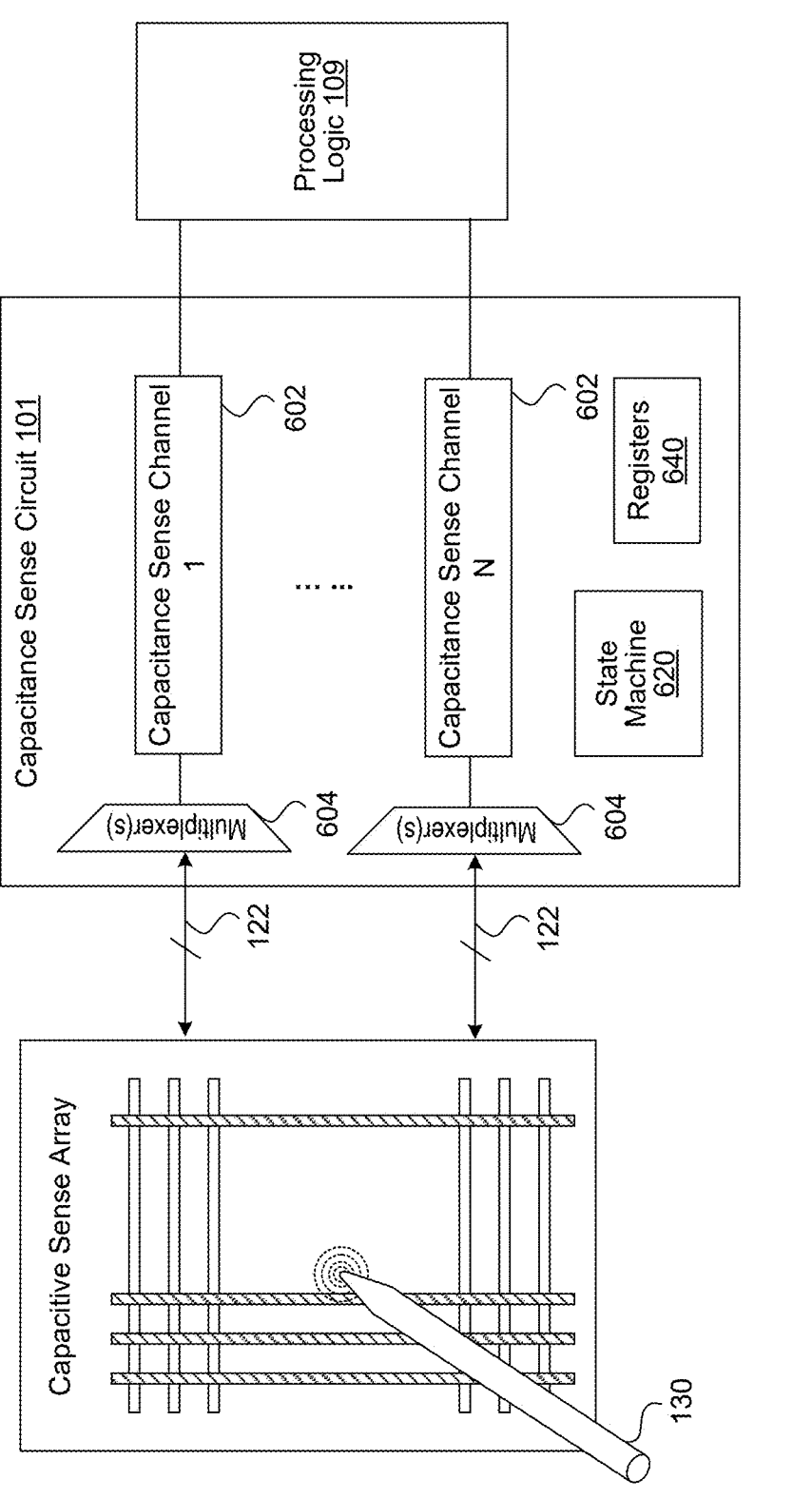
FIG. 6 is a schematic diagram of an example capacitance sense circuit that is configured to measure capacitive sense signals during capacitive sense scans, in accordance with some embodiments.

FIG. 6 is a schematic diagram of an example capacitance sense circuit 101 that is configured to measure capacitive sense signals during capacitive sense scans, in accordance with some embodiments. The capacitance sense circuit 101 includes one or more capacitive sense channels 602. In some embodiments, the channels are substantially identical. Each of the one or more capacitance sense channels 602 is coupled to the multiplexers 604, thereby enabling connection to capacitive sense electrodes of the capacitive sense array 125 by the bus 122. When the multiplexers 604 for a capacitance sense channel 602 select one or more of the sense electrodes of the capacitive sense array 125, the capacitance sense channel 602 is configured to measure the corresponding capacitive sense signal(s) for detecting candidate touches on the touch sensing surface.

In some embodiments, the capacitance sense circuit 101 includes a state machine 620 and registers 640. For example, the registers 640 include configuration information for the capacitive sense electrodes selected for the capacitive sense scans, a scan frequency, and pulse numbers of a transmission signal used for mutual capacitance scan. Referring to FIG. 6, the state machine 620 obtains information stored in the registers 640 to configure the capacitance sense channels 602 to measure capacitive sense signals provided during the capacitive sense scans.

Figure 7:
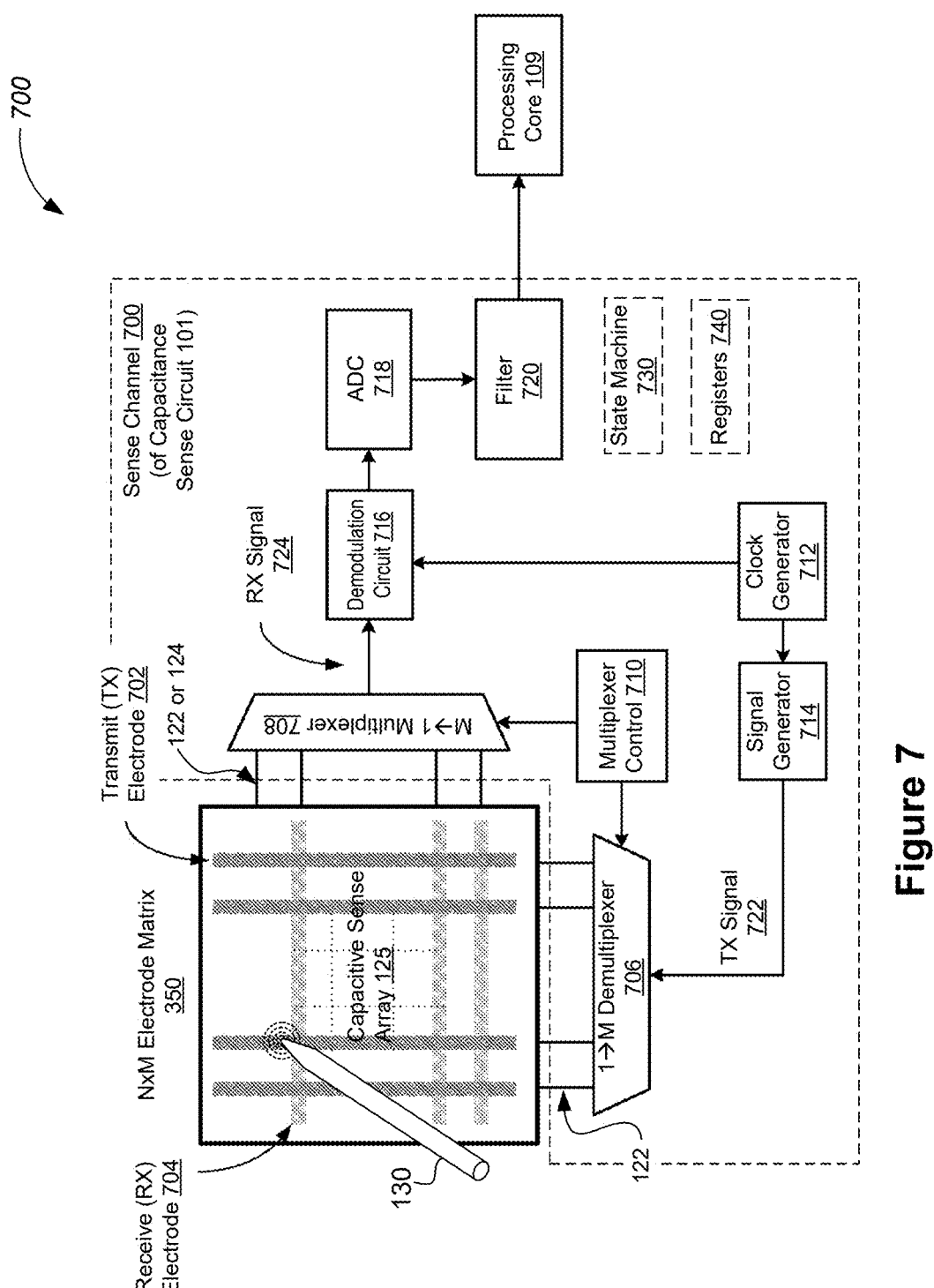
FIG. 7 is a schematic diagram of another example capacitance sense circuit that provides an integrated sense channel to measure capacitive sense signals during capacitive sense scans, in accordance with some embodiments.

FIG. 7 is a schematic diagram of another example capacitance sense circuit 101 that provides an integrated sense channel 700 to measure capacitive sense signals during capacitive sense scans, in accordance with some embodiments. The sense channel 700 is configured to measure the capacitive sense signals associated with changes in measured capacitances during a capacitive sense scan (e.g., a MC scan and a SC scan). In some embodiments, the capacitive sense array 125 and capacitance sense circuit 101 are implemented in a system such as electronic system 100. During the capacitive sense scan, the capacitive sense signals are further processed to determine coordinates indicating the presence and location of touch. The coordinates are calculated based on changes in measured capacitances relative to the capacitances of the same touch capacitive sense array 125 in an un-touched state. In some embodiments, the capacitive sense array 125 includes a matrix 350 of N×M electrodes (N receive electrodes and M transmit electrodes), which includes transmit electrode 702 and receive electrode 704. Each of the electrodes in the matrix 350 is connected with the demultiplexer 706 or the multiplexer 708 of the capacitance sense circuit 101 by the bus 122. During a mutual capacitive scan, each of the electrodes in the matrix 350 is configured to receive a transmission signal from the capacitance sense circuit 101 by the bus 122, or provide a capacitive sense signal to the capacitance sense circuit 101 by the bus 122.

The sense channel 700 of the capacitance sense circuit 101 includes a multiplexer control 710, a demultiplexer 706, a multiplexer 708, a clock generator 712, a signal generator 714, a demodulation circuit 716, and an analog to digital converter (ADC) 718. The ADC 718 is further coupled with a filter 720. The filter 720 is optionally implemented in the processing core 109. The above circuit blocks 706-720 are applied for mutual capacitance scans. However, some of these circuit blocks (e.g., the demultiplexer 706, the clock generator 712, and the signal generator 714) are disabled for self-capacitance scans because self-capacitance scans do not need transmission signals to drive the capacitive sense array 125.

The transmit and receive electrodes in the electrode matrix 350 may be arranged so that each of the transmit electrodes overlaps and crosses each of the receive electrodes, forming an array of intersections, while maintaining galvanic isolation from each other. Thus, each transmit electrode may be capacitively coupled with each of the receive electrodes. For example, the transmit electrode 702 is capacitively coupled with the receive electrode 704 at the point where the transmit electrode 702 and the receive electrode 704 overlap.

The clock generator 712 supplies a clock signal to the signal generator 714, which produces a TX signal 722 to be supplied to the transmit electrodes of capacitive sense array 125. In some embodiments, the signal generator 714 includes a set of switches that operate according to the clock signal from clock generator 712. The switches may generate a TX signal 722 by periodically connecting the output of the signal generator 714 to a first voltage and then to a second voltage, where the first and second voltages are different.

The output of signal generator 714 is connected with a demultiplexer 706, which allows the TX signal 722 to be applied to any of the M transmit electrodes of the capacitive sense array 125. In some embodiments, the multiplexer control 710 controls demultiplexer 706 so that the TX signal 722 is applied to each transmit electrode 702 in a controlled sequence. The demultiplexer 706 may also be used to ground, float, or connect an alternate signal to the other transmit electrodes to which the TX signal 722 is not currently being applied. In some implementation, the TX signal 722 is presented in a true form to a subset of the transmit electrodes 702 and in a complement form to a second subset of the transmit electrodes 702, where there is no overlap in members of the first and second subsets of transmit electrodes 702.

Because of the capacitive coupling between the transmit and receive electrodes, the TX signal 722 applied to each transmit electrode induces a current within each of the receive electrodes. For instance, when the TX signal 722 is applied to transmit electrode 702 through demultiplexer 706, the TX signal 722 induces an RX signal 724 on the receive electrodes in matrix 350. The RX signal 724 on each of the receive electrodes can then be measured in sequence by using the multiplexer 708 to connect each of the N receive electrodes to demodulation circuit 716 in sequence.

The mutual capacitance associated with each intersection between a TX electrode and an RX electrode can be sensed by selecting every available combination of TX electrode and an RX electrode using the demultiplexer 706 and the multiplexer 708. To improve performance, the multiplexer 708 may also be segmented to allow more than one of the receive electrodes in the matrix 350 to be routed to additional demodulation circuits 716. In configurations with a 1-to-1 correspondence of instances of demodulation circuit 716 with receive electrodes, the multiplexer 708 may not be present in the system.

When an object, such as a finger, approaches the electrode matrix 350, the object causes a change in the measured mutual capacitance between only some of the electrodes. For example, if a finger is placed near the intersection of transmit electrode 702 and receive electrode 704, the presence of the finger will decrease the charge coupled between electrodes 702 and 704. Thus, the location of the finger on the touchpad can be determined by identifying the one or more receive electrodes having a decrease in measured mutual capacitance in addition to identifying the transmit electrode to which the TX signal 722 was applied at the time the decrease in capacitance was measured on the one or more receive electrodes.

By determining the mutual capacitances associated with each intersection of electrodes in the matrix 350, the presence and locations of one or more conductive objects may be determined. The determination may be sequential, in parallel, or may occur more frequently at commonly used electrodes.

In some embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced RX signal 724 is integrated by the demodulation circuit 716. The rectified current output by demodulation circuit 716 can then be converted to a digital code by the ADC 718, and filtered by a filter 720 based on a baseline associated with the corresponding TX and RX electrodes. In some embodiments, the baseline associated with each combination of TX and RX electrodes is adjusted individually according to a surface condition at a corresponding location of the touch sensing surface (e.g., whether the corresponding location is covered by a water drop).

A series of such filtered digital codes measured from adjacent sensors or intersections is further converted to touch coordinates indicating a position of an input on touch capacitive sense array 125 by a touch coordinate converter (not shown) optionally disposed in the capacitance sense circuit 101, the touch sense driver 102, or the processing core 109. The touch coordinates may then be used to detect gestures or perform other functions by the processing core 109.

In some embodiments, the capacitance sense circuit 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

In some embodiments, the sense channel 700 includes a state machine 730 and registers 740. The registers 740 store information for capacitive sense electrodes selected for capacitive sense scans or stylus scans, a scan frequency, and pulse numbers of a transmission signal used for mutual capacitance scans or stylus scans. The state machine 730 obtains information stored in the registers 740 to configure the demultiplexer 706, the multiplexer 708, the clock generator 712, the signal generator 714, and the demodulation circuit 716 to measure capacitive sense signals provided by the capacitive sense array 125 during a corresponding capacitive sense scan or a stylus scan.

Figures 8A, 8B:
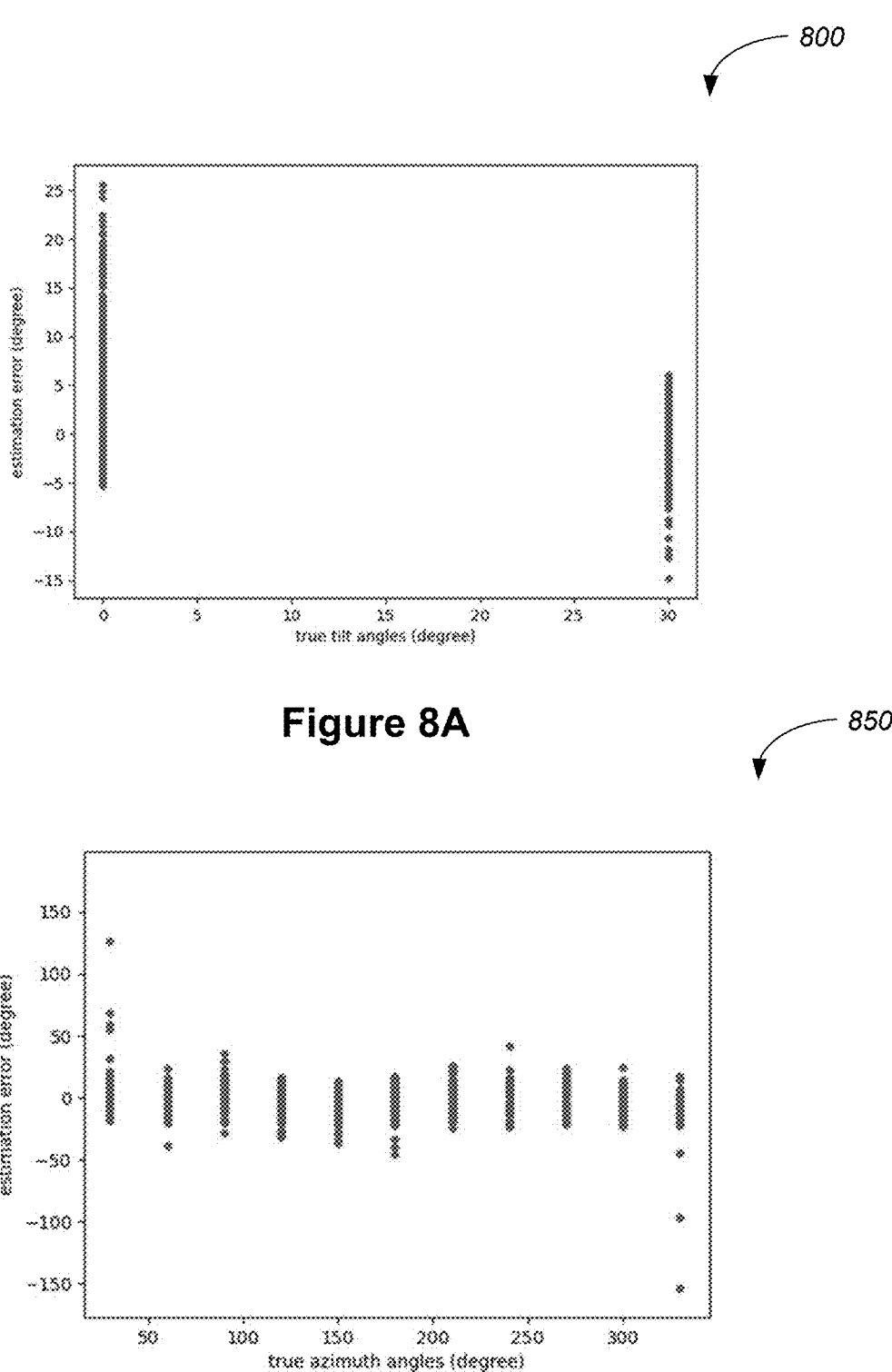
FIG. 8A is a plot of example estimation errors of a tilting angle of a passive stylus, in accordance with some embodiments.
FIG. 8B is a plot of example estimation errors of a rotational angle of a passive stylus, in accordance with some embodiments.

FIG. 8A is a plot 800 of example estimation errors of a tilting angle $\varphi$ of a passive stylus 130, in accordance with some embodiments, and FIG. 8B is a plot 850 of example estimation errors of a rotational angle $\theta$ of a passive stylus 130, in accordance with some embodiments. The tilting angle $\varphi$ and rotational angle are determined using a machine learning model 408 (e.g., a stylus orientation determination model) based on a touch map 406 constructed based capacitive sense signals 405. For example, the capacitive sense signals 405 is collected from at least a subset of a capacitive sense array 125 that interacts with a passive stylus 130 having a tip size of 1 mm. In some embodiments, the tilting angle $\varphi$ determined by the machine learning model 408 is one of a set of predefined tilting angle values. Alternatively, in some embodiments, the tilting angle $\varphi$ determined by the machine learning model 408 is a real number angle value in a respective range. In some embodiments, the rotational angle θ determined by the machine learning model 408 is one of a set of predefined rotational angle values. Alternatively, in some embodiments, the rotational angle θ determined by the machine learning model 408 is a real number angle value in a respective range.

Referring to FIG. 8A, in some situations, an actual tilting angle φ in a range of −25 to 5 degrees is recognized as a true tilting angle of 0 degree, and corresponds to estimation errors of −5 to 25 degrees. In some situations, an actual tilting angle φ in a range of 25 to 45 degrees is recognized as a true tilting angle of 30 degrees, and corresponds to an estimation errors of −15 to 5 degrees. Referring to FIG. 8B, in some situations, true rotational angles θ outputted by the machine learning model 408 is one of a set of predefined rotational angle values, e.g., 30, 60, 90, 120, 150, 180, 210, 240, 270, 300, and 330 degrees. Each true rotational angle θ corresponds to a respective range of estimation errors. For example, when the true rotational angle θ is measured to be 20 degrees, the errors range from −20 to 130 degrees, and an actual rotational angle θ of the passive stylus 130 is in a range of −110 to 40 degrees. In another example, when the true rotational angle θ is measured to be 120 degrees, the errors range from −40 to 20 degrees, and the actual rotational angle θ of the passive stylus 130 is in a range of 100 to 160 degrees.

FIG. 9 is a flowchart for an example method 900 of monitoring stylus touch events, in accordance with some embodiments. In some embodiments, the method 900 is performed by an electronic system 100 (FIG. 1) or one or more components thereof, such as a processing device 110 including a capacitance sense circuit 101 and/or a processing core 109. In some embodiments, the method 900 is performed by a touch detection device or a component thereof. In some embodiments, the operations of the method 900 described herein are interchangeable, and respective operations of the method 900 are performed by any of the aforementioned devices, systems, or combination of devices and/or systems. In some embodiments, the method 900 is governed by instructions that are stored in a non-transitory computer-readable storage medium, and are executed by one or more processors of a device/computing system, such as a processing device 110 of the electronic system 100. For convenience, the method 900 will be described below as being performed by a touch detection device.

The processing device 110 is coupled (operation 902) to a capacitive sense array 125. The capacitive sense array 125 includes a plurality of sense electrodes. The processing device 110 scans (operation 904) the capacitive sense array 125 to obtain a plurality of capacitive sense signals 405 from the plurality of sense electrodes of the capacitive sense array 125. The processing device 110 generates (operation 906) a touch map 406 of the capacitive sense array 125 based on the plurality of capacitive sense signals 405 and determines (operation 908) that the touch map corresponds to a passive stylus 130. In accordance with a determination that the touch map corresponds to the passive stylus 130, the processing device 110 determines (operation 910) a stylus position and one or more orientation parameters 410 of the passive stylus 130 with respect to a surface of the capacitive sense array.

In some embodiments, the processing device 110 determines the stylus position and the one or more orientation parameters 410 of the passive stylus 130 by applying a stylus parameter determination model (e.g., corresponding to machine learning models 408 in FIGS. 4A-4C and 5) to process the touch map and determine at least the one or more orientation parameters 410 of the passive stylus 130. In some embodiments, the stylus parameter determination model includes a machine learning model 408. In some embodiments, the processing device 110 applies the machine learning model to process to the touch map 406 to determine a position of the conductive tip 212 of the stylus 130 on the surface 218 of the capacitive sense array 125 jointly with the one or more first orientation parameters 410 410 of the stylus 130. In some embodiments, the processing device 110 determines a position of the stylus 130 on the surface 218 of the capacitive sense array 125 and/or whether the stylus 130 hovers above or physically touches the surface 218 of the capacitive sense array 125 based on the plurality of capacitive sense signals 405. Further, in some embodiments, the determination is made based on the plurality of capacitive sense signals 405 directly. Alternatively, in some embodiments, the machine learning model 408 is applied to make the determination based on the touch map 406. For example, the processing device 110 applies the machine learning model 408 to process the touch map 406 to determine whether the stylus 130 hovers above or physically touches the surface 218 of the capacitive sense array 125, e.g., including a distance of the conductive tip 212 of the stylus 130 from the surface 218.

In some embodiments, the one or more first orientation parameters 410 includes (914) one or both of: a tilting angle φ (also referred to as the "tilting angle") measured with respect to the surface 218 of the capacitance sense array and a rotational angle θ (also referred to as the "azimuth angle") measured with respect to a reference axis on the surface 218 of the capacitance sense array. In some embodiments, the tilting angle φ is in a tilting range with a tilting resolution, and the rotational angle θ is in a rotation range with a rotation resolution. In some embodiments, one of the tilting resolution and the rotation range is non-uniform in a respective range of the tilting range and the rotation range. In some embodiments, in accordance with a selection of a first machine learning model, the processing device 110 determines the first orientation parameter in a first orientation range with a first orientation resolution. In some embodiments, in accordance with a selection of a second machine learning model, the processing device 110 determines the first orientation parameter in a second orientation range with a second orientation resolution distinct from the first orientation resolution. In some embodiments, the first orientation resolution is uniform, and the second orientation resolution is non-uniform.

In some embodiments, the method 900 includes obtaining a plurality of training touch maps for a plurality of test styluses 130T and a set of ground truth orientation parameters 510. A touch map corresponds to a subset of respective ground truth orientation parameters 510 of a test stylus 130T. In some embodiments, training the stylus parameter determination model includes using the plurality of training touch maps and the set of ground truth orientation parameters 510. In some embodiments, the method 900 includes obtaining a set of ground truth stylus positions of the plurality of test styluses 130T. Each training touch map corresponds to a ground truth stylus position of a test stylus 130T, and the stylus parameter determination model is trained using the plurality of training touch maps, the set of ground truth orientation parameters 510, and the set of ground truth stylus positions. The stylus parameter determination model is applied to process the touch map and determine the stylus position of the passive stylus 130. In some embodiments, the stylus parameter determination model is applied to select one of a plurality of predefined orientation values for each of the one or more orientation parameters 410. For example, an output vector includes an indicator associated with each orientation parameter for selecting one or more orientation parameters 410.

In some embodiments, the stylus parameter determination model included a convolutional neural network (CNN), and is provided to the processing device 110. An example of a CNN includes a plurality of 2D convolutional layers, and a final fully-connected layer coupled to the convolutional layers. In some embodiments, the processing device obtains model parameters of the CNN from a computer device distinct from the processing device. Alternatively, in some embodiments, the stylus parameter determination model is based on one of a residual neural network (ResNet), an encoder-decoder network, a transformer network, a neural radiance field, a multi-stage support vector machine (SVM), and a recursive neural network (RNN). In some embodiments, the stylus parameter determination model is stored in memory of the processing device in an encrypted format. In some embodiments, the stylus parameter determination model is trained in a server and provided to the processing device 110 in an encrypted format. In some embodiments, the stylus parameter determination model includes a neural network distinct from the CNN.

In some embodiments, the touch map 406 has an image resolution that is identical to an array resolution of the plurality of capacitive sense electrodes, and each element of the touch map 406 has a respective capacitive value that is determined based on a respective subset of the plurality of capacitive sense signals 405. In some embodiments, the touch map 406 has an image resolution that is lower than an array resolution of the plurality of capacitive sense electrodes. The processing device 110 determines a peak of the plurality of capacitive sense signals 405 that is measured by a peak electrode of the plurality of capacitive sense electrodes, and identifies subset of the plurality of capacitive sense electrodes including the peak electrode. The touch map 406 corresponds to the subset of the plurality of capacitive sense electrodes.

In some embodiments, the processing device determines that the touch map corresponds to a passive stylus 130 including determining that a touch event has occurred on or near the surface of the capacitive sense array. The touch event may correspond to a conductive object touching, or hovering above, the surface of the capacitive sense array. The processing device determines that the touch event includes a passive stylus touch distinct from a finger touch, for example, in accordance with a determination that a signal-to-noise ratio (SNR) of the plurality of capacitive sense signals 405 meets a signal quality criterion. In some embodiments, the processing device identifies an area that corresponds to the touch event and includes at least the subset of capacitive sense array, and determines a signal stress value based on a peak signal level of the plurality of capacitive sense signals 405. In some embodiments, a conductive object is proximate to the surface of the capacitive sense array, and induces the plurality of capacitive sense signals 405 on the subset of sense electrodes. In some embodiments, the passive stylus 130 includes a conductive tip cover configured to mechanically couple to a tip of a writing tool and convert the writing tool to the passive stylus 130.

In some embodiments, the processing device applies a filter to the plurality of capacitive sense signals 405 to control a noise level of the plurality of capacitive sense signals 405 before generating the touch map. In some embodiments, this reduces noise, for example, introduced by human jittery input. In some embodiments, this may be done in a host application.

Figure 10:
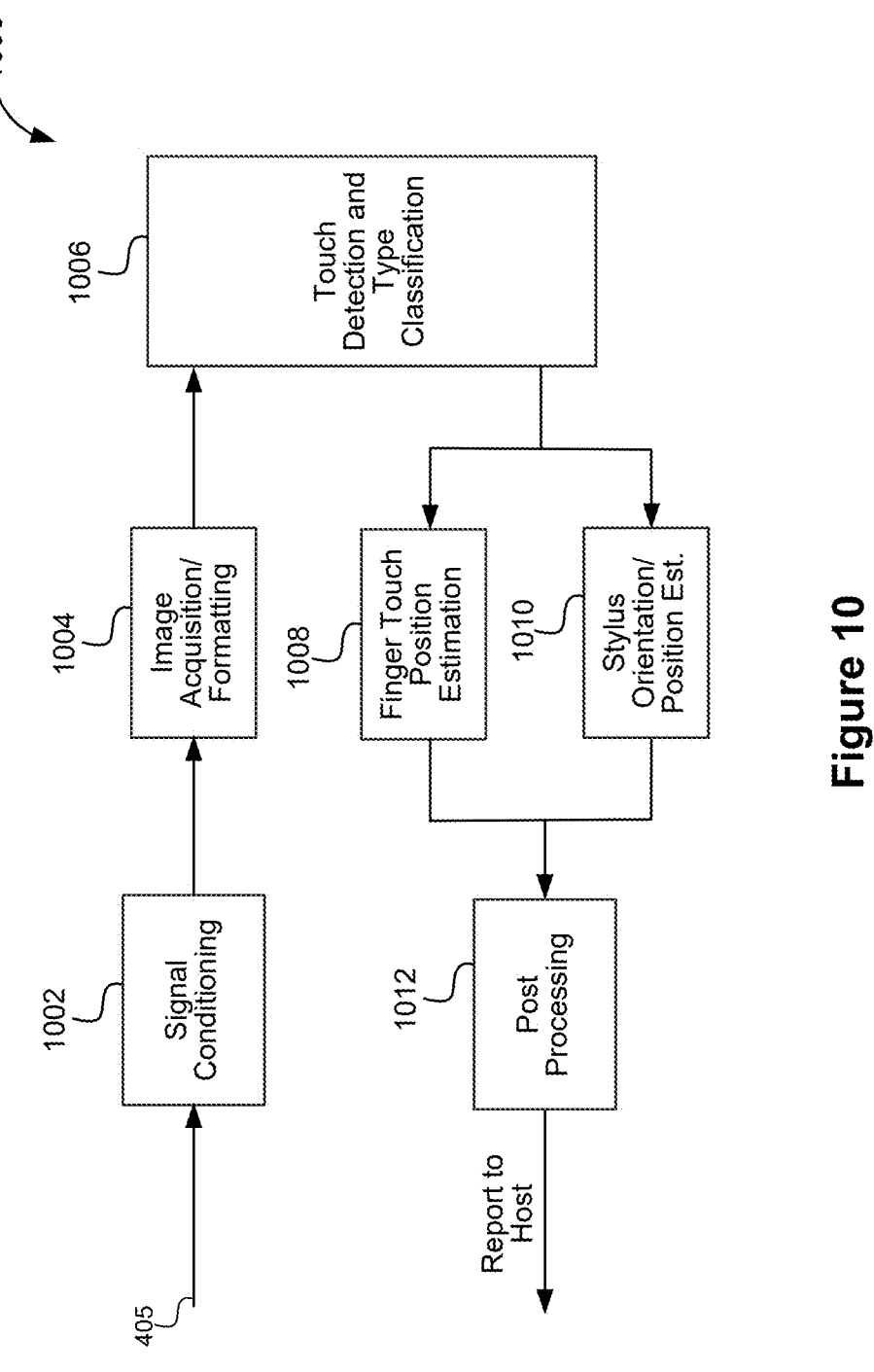
FIG. 10 illustrates a system block diagram showing an exemplary signal flow for monitoring stylus touch events, in accordance with some embodiments.

FIG. 10 is a flow diagram of another example process 1000 for monitoring stylus touch events. A touch scanner circuit 404 (FIG. 4) scans a capacitive sense array 125 to obtain a plurality of capacitive sense signals 405 from a plurality of capacitive sense electrodes of the capacitive sense array 125, and generates a touch map 406 of the capacitive sense array 125 based on the plurality of capacitive sense signals 405. The process 1000 includes signal conditioning 1002 of the plurality of capacitive sense signals 405, which is followed by image acquisition and formatting 1004. In some embodiments, signal conditioning 1002 may include linear and non-linear filtering of the capacitive sense signals 405. The process 1000 further includes touch detection and type classification 1006 implemented based on the touch map 406, resulting in finger touch position estimation 1008 or stylus position and orientation estimation 1010. In some embodiments, a machine learning model 408 is applied to process the touch map 406 to determine a position and one or more orientation parameters 410 of the stylus 130 with respect to a surface 218 of the capacitive sense array 125. In some embodiments, position or orientation information is reported to host after post processing 1012.

In some embodiments, stylus orientation estimation 1010 may also include position estimation. In some embodiments, stylus position estimation 1010 may be differentiated with finger touch position estimation. In some embodiments, post processing 1012 may include tracking improvement, e.g., Kalman filtering, line smoothing, and the like.

It should be understood that the particular order in which the operations in FIG. 9 have been described is merely exemplary and are not intended to indicate that the described order is the only order in which the operations could be performed. One of ordinary skill in the art would recognize various ways to reorder the operations described herein. Additionally, it should be noted that details of a process described herein with respect to FIG. 9 are also applicable in an analogous manner to any other systems, devices, or methods described in FIGS. 1-8. For brevity, these details are not repeated in the description for different figures.

It will be understood that, although the terms first, second, etc. are, in some instances, used herein to describe various elements, these elements should not be limited by these terms. These terms are only used to distinguish one element from another. For example, a first voltage could be termed a second voltage, and, similarly, a second voltage could be termed a first voltage, without departing from the scope of the various described embodiments. The first voltage and the second voltage are both voltage levels, but they are not the same voltage level.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of monitoring stylus touch events, comprising:

at a processing device coupled to a capacitive sense array, the capacitive sense array including a plurality of sense electrodes:

scanning a subset of sense electrodes of the capacitive sense array to obtain a plurality of capacitive sense signals;

generating a touch map from at least a subset of the capacitive sense array based on the plurality of capacitive sense signals;

determining that the touch map corresponds to a passive stylus; and in accordance with a determination that the touch map corresponds to the passive stylus, determining a stylus position and one or more orientation parameters of the passive stylus with respect to a surface of the capacitive sense array.

2. The method of claim 1, wherein determining the stylus position and the one or more orientation parameters of the passive stylus further comprises applying a stylus parameter determination model to process the touch map and determine at least the one or more orientation parameters of the passive stylus.

3. The method of claim 2, further comprising:

obtaining a plurality of training touch maps for a plurality of test styluses and a set of ground truth orientation parameters, wherein each training touch map corresponds to a subset of respective ground truth orientation parameters of a respective test stylus; and training the stylus parameter determination model using the plurality of training touch maps and the set of ground truth orientation parameters.

4. The method of claim 3, further comprising:

obtaining a set of ground truth stylus positions of the plurality of test styluses, wherein each training touch map corresponds to a respective ground truth stylus position of the respective test stylus, and the stylus parameter determination model is trained using the plurality of training touch maps, the set of ground truth orientation parameters, and the set of ground truth stylus positions; and wherein the stylus parameter determination model is applied to process the touch map and determine the stylus position of the passive stylus.

5. The method of claim 2, wherein the stylus parameter determination model is applied to select one of a plurality of predefined orientation values for each of the one or more orientation parameters.

6. The method of claim 2, wherein the stylus parameter determination model includes a convolutional neural network (CNN), the method further comprising obtaining model parameters of the CNN from a computer device distinct from the processing device.

7. The method of claim 1, wherein determining that the touch map corresponds to a passive stylus comprises:

determining that a touch event has occurred on or near the surface of the capacitive sense array, wherein the touch event corresponds to a conductive object touching, or hovering above, the surface of the capacitive sense array; and determining that the touch event includes a passive stylus touch distinct from a finger touch.

8. The method of claim 7, wherein determining that the touch event includes the passive stylus touch distinct from the finger touch further comprises:

in accordance with a determination that a signal-to-noise ratio (SNR) of the plurality of capacitive sense signals meets a signal quality criterion:

identifying an area that corresponds to the touch event and includes at least the subset of capacitive sense array; and determining a signal stress value based on a peak signal level of the plurality of capacitive sense signals.

9. The method of claim 7, wherein a conductive object is proximate to the surface of the capacitive sense array, and induces the plurality of capacitive sense signals on the subset of sense electrodes.

10. The method of claim 1, wherein the passive stylus includes a conductive tip cover configured to mechanically couple to a tip of a writing tool and convert the writing tool to the passive stylus.

11. The method of claim 1, wherein the one or more orientation parameters include at least one of a tilting angle $\varphi$ determined with respect to the surface of the capacitance sense array and a rotational angle $\theta$ determined with respect to a reference axis that passes the stylus position and lies on the surface of the capacitance sense array.

12. The method of claim 11, the method further comprising:

determining the tilting angle $\varphi$, wherein the tilting angle $\varphi$ is in a tilting range with a tilting resolution; and determining the rotational angle $\theta$, wherein the rotational angle $\theta$ is in a rotation range with a rotation resolution.

13. The method of claim 12, wherein one of the tilting resolution and the rotation range is non-uniform in a respective range of the tilting range and the rotation range.

14. The method of claim 1, wherein determining the one or more orientation parameters further comprises determining a first orientation parameter by:

in accordance with a selection of a first machine learning model, determining the first orientation parameter in a first orientation range with a first orientation resolution; and in accordance with a selection of a second machine learning model, determining the first orientation parameter in a second orientation range with a second orientation resolution distinct from the first orientation resolution.

15. The method of claim 1, further comprising:

before generating the touch map, applying a filter to the plurality of capacitive sense signals to control a noise level of the plurality of capacitive sense signals.

16. The method of claim 1, wherein the touch map has an image resolution that is identical to an array resolution of the plurality of sense electrodes, and each element of the touch map has a respective capacitive value that is determined based on a respective subset of the plurality of capacitive sense signals.

17. The method of claim 1, wherein the touch map has an image resolution that is smaller than an array resolution of the plurality of sense electrodes, the method further comprising:

determining that a peak electrode has a largest capacitive sense signal level among the plurality of sense electrodes; and based on a location of the peak electrode, selecting the subset of sense electrodes corresponding to the touch map.

18. The method of claim 1, wherein generating the touch map from at least the subset of the capacitive sense array further comprises monitoring self-capacitance or mutual capacitance of the subset of sense electrodes based on the plurality of capacitive sense signals.

19. A processing device, comprising:

a processing core, wherein the processing device is coupled to a capacitive sense array including a plurality of sense electrodes; and memory storing one or more programs configured for execution by the processing core, the one or more programs comprising instructions for:

scanning a subset of sense electrodes of the capacitive sense array to obtain a plurality of capacitive sense signals;

generating a touch map from at least a subset of the capacitive sense array based on the plurality of capacitive sense signals;

determining that the touch map corresponds to a passive stylus; and in accordance with a determination that the touch map corresponds to the passive stylus, determining a stylus position and one or more orientation parameters of the passive stylus with respect to a surface of the capacitive sense array.

20. A non-transitory computer-readable storage medium, storing one or more programs for execution by one or more processors, the one or more programs comprising instructions for:

scanning a subset of sense electrodes of a capacitive sense array to obtain a plurality of capacitive sense signals;

generating a touch map from at least a subset of the capacitive sense array based on the plurality of capacitive sense signals;

determining that the touch map corresponds to a passive stylus; and in accordance with a determination that the touch map corresponds to the passive stylus, determining a stylus position and one or more orientation parameters of the passive stylus with respect to a surface of the capacitive sense array.

\* \* \* \* \*